(12) United States Patent     (10) Patent No.:    US 12,675,832 B2

Mehra et al.                   (45) Date of Patent:       Jul. 7, 2026

(54) DEATH TRIGGERED DEVICE, COMMUNICATION AND MANAGEMENT SYSTEM

(71) Applicant: Alka Mehra, Mumbai (IN)

(72) Inventors: Deepak Mehra, Mumbai (IN); Kevin Earl Meyer, Hooksett, NH (US)

( * ) Notice: Subject to any disclaimer, the term of this patent is extended or adjusted under 35 U.S.C. 154(b) by 0 days.

(21) Appl. No.: 17/413,972

(22) PCT Filed: Mar. 17, 2021

(86) PCT No.: PCT/IN2021/050270

§ 371 (c)(1),
(2) Date: Jun. 15, 2021

(87) PCT Pub. No.: WO2021/240537

PCT Pub. Date: Dec. 2, 2021

(65) Prior Publication Data

US 2023/0316441 A1     Oct. 5, 2023

(30) Foreign Application Priority Data

May 28, 2020    (IN) ............................. 201921048838

(51) Int. Cl.
    *G06Q 30/00*       (2023.01)
    *G06Q 20/32*       (2012.01)
    *G06Q 50/18*       (2012.01)
(52) U.S. Cl.
    CPC ....... *G06Q 50/186* (2013.01); *G06Q 20/3226* (2013.01); *G06Q 20/321* (2020.05)
(58) Field of Classification Search
    CPC .................................................. G06Q 50/186

USPC ....... 705/42, 1.1, 35, 50, 4, 3, 312, 2; 726/9
See application file for complete search history.

(56)            References Cited

U.S. PATENT DOCUMENTS

| | | | |
|---|---|---|---|
| 9,491,277 B2 * | 11/2016 | Vincent ................... | H04W 4/90 |
| 2008/0162352 A1 * | 7/2008 | Gizewski ................ | G16Z 99/00 |
| | | | 705/50 |
| 2015/0286813 A1 * | 10/2015 | Jakobsson .............. | A61B 5/681 |
| | | | 726/9 |
| 2015/0288797 A1 * | 10/2015 | Vincent .................. | G16H 10/60 |
| | | | 455/404.2 |

OTHER PUBLICATIONS

ProQuestDialogNPL Search History.*
ip.com NPL Search History.*

* cited by examiner

*Primary Examiner* — John H. Holly

(57)            ABSTRACT

A death triggered device (100) having a plurality of primary sensors (30) and a plurality of validation sensors (40), configured for a personal details of a specifically identifiable user (120) in an active mode (55), by the user (120) wearing the death triggered device (100) in a set up situation (70) when the primary sensors (30) pick as a benchmark the life parameters of the user (120), and executes instructions including legal actions. A run situation (90) having a peace time (83) and a crisis time (84). At least a removable plurality of interlocked charging arrangement (130) dispos-able on a left side (15) and or a right side (16) on an enclosure (13), each comprising a receiver port (140) engage-able and dis-engage-able with a delivery port (161) of a delivery device (160) in a prescribed orientation; a wearable arrangement (13) having a plurality of mode sensors (50).

25 Claims, 24 Drawing Sheets

30

40

30

50

100

Figure 11:
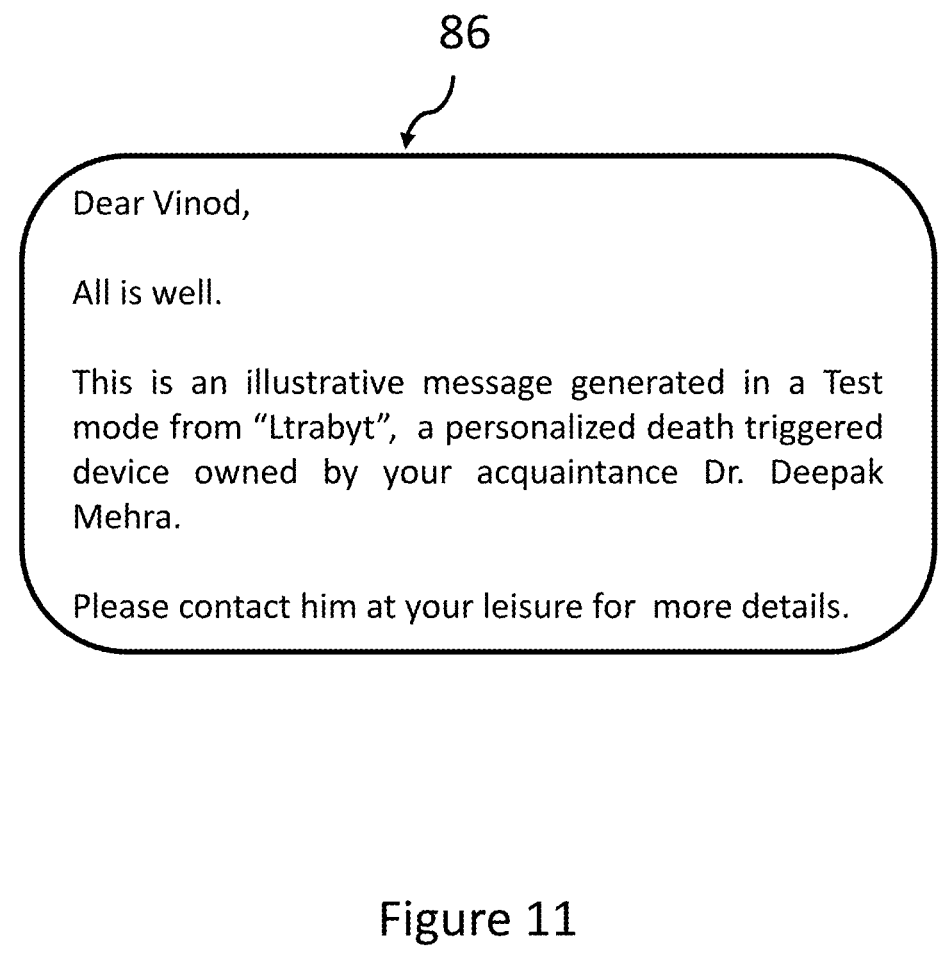

86

Dear Vinod,

All is well.

This is an illustrative message generated in a Test mode from "Ltrabyt", a personalized death triggered device owned by your acquaintance Dr. Deepak Mehra.

Please contact him at your leisure for more details.

DEATH TRIGGERED DEVICE, COMMUNICATION AND MANAGEMENT SYSTEM

CLAIM OF PRIORITY

This application claims priority to Indian Provisional Patent Application No. 201921048838 filed on May 28, 2020, titled "DEATH TRIGGERED DEVICE, COMMUNICATION AND MANAGEMENT SYSTEM".

FIELD OF INVENTION

The present invention relates to a death triggered device for managing pre-death and post-death events. Particularly the invention relates to managing financial, legal and administrative events of wearer of the device that detects unstable health and death of its owner and proceeds as per his requirements, desire and "will".

BACKGROUND

Death of a person results into a plethora of unscheduled activities to be done by kin of the deceased and such activities get done half-heartedly and hap hazardously. A person has no control on his or her post-death events other than leaving a legally proper will document.

There are attempts to manage post-death events. Publication No. JP2002063267 discloses a means for registering, changing and deleting a message, a message destination and the trigger condition for sending a message from a terminal to a database by a living individual whose ID is registered, and means for sending a registered message to a destination, when a registered trigger condition is satisfied after the death of the individual. JP2009009348 discloses a post-funeral message delivery system including an information creation/communication processing terminal for making an application via a communication network to a computer device of a management organization for sending a post-funeral message to the addressee after the bereaved family makes a post-death contact to the computer device. US publication no 20120047055 discloses a post "end-of-life" management system and method comprising registering and setting up directives to manage on-accounts, digital data, and perform other function by providers, after the death of the registrant. The system is integrated with the social security administration to receive death notifications from the death master file as well as the deceased individual counterparts of other countries. Registrant accounts are encrypted and stored in the system and triggered to decrypt in order to carry out directives left by deceased after notification of death is received from the social security administration or diseased individual registry counterpart of other country.

A person has no control on place and time of death. There are a large number of instances when a well to do person dies at place and at time when there is no person or help around. Several times, even identification of a dead person is a challenge.

Prior art is dependent upon a confirmation from family or friend and not a real time death trigger.

A person may change his mind, wish and or will, till last breath even if he or she is very close to the eventuality of death, however prior art does not address such basic requirement.

Present invention overcomes this important function effectively and to the satisfaction of the deceased.

OBJECTS OF INVENTION

To detect death of person owning the device as per present invention and communicate to pre-decided agencies and persons.

To distinguish between owner and others before communicating death.

To repeatedly verify in situations of uncertainty between owner and others.

To self-distinguish between active and inactive state of device.

To provide aid to persons wishing to execute certain financial and legal transactions JUST BEFORE they are dead.

To provide for frequent alterations in owner's wishes.

To provide for alterations in owner's wish almost till his or her last breath!

To provide for a reliable method and system of supplying an electrical energy and connectivity to the device.

SUMMARY OF INVENTION

A death trigger is interpreted throughout this disclosure as a reliable energy signal picked up from a body of a user owning the death triggered device as per present invention. The death trigger includes the reliable body energy trigger picked from the body when the person is not yet medically dead however symptomatically not likely to survive. The death trigger not initiated by the body of the user but initiated by another person or device based on his or her observation and or any database or any other means is not in the objectives of the present invention.

The present invention is a death triggered device which is generally always on a body of a user. The device houses a hardware, which is developed specific to this application keeping lower power consumption, smallest size and optimum speed of execution as per the present invention. The device is disposed with a plurality of sensors, grouped into a plurality of primary sensors, a plurality of validation sensors and a plurality of mode sensors.

The primary sensors monitor a state of life or a state of death of the user. Further, the state of life is monitored for a stable state and an unstable state. The stable state is a healthy medical state of a vital parameters of the user with no medical probability of a natural death in a near future, while the unstable state is an unhealthy medical state of the vital parameters of the user pointing towards a high medical probability of a natural death. The validation sensors identify the user of the death triggered device. Since the very objective of the present invention is to provide post death support as per wish and needs of the specific user, the primary sensors are to flawlessly and precisely identify the specific user by a comprehensive set up method and any change of user would be through a validated change of the comprehensive set up. The validation sensors as a preferred embodiment is a biometric sensor including a biometric fingerprint reader, iris, face, voice, sound of a heartbeat, and or a combination thereof. Generally, such sensors read or measure light, temperature, speed, electrical capacity and other types of bodily energies of the user. The primary sensors function and the validation sensor function may be performed by a common sensor. The mode sensors sense that the death triggered device is indeed worn by the user and is not kept away. This is to differentiate between a state of death of the user and the inactive mode of the device. In other words, when the state of life is not sensed, it does not necessarily imply the state of death. Also, mode sensors are essential to interpret "no electric energy" situation of the death triggered device, as different from the state of death and or sabotage. On restoration of power by charging, the death triggered device first assumes an inactive mode and thereafter the validation sensors followed by the primary sensors restore the functioning of the death triggered device as explained later below.

When the death triggered device is in the active mode, the user selects a set up situation, an update situation, a test situation or a run situation. In the set up situation and the update situation, the death triggered device is configured. In the set up situation, which is a first time set up situation, the death triggered device is configured for a personalization—a personal details and credentials, a biometric parameters and a life and health parameters of the user. The death triggered device is set up by wearing by the user so that the validation sensors of the death triggered device pick and store the biometric parameters of the user. Next, the primary sensor picks and stores as reference the life and health parameters of the user. In the update situation, the user uploads legal documents, contact details, bank details, wishful instructions and wishful transactions. The scope of this feature of the present invention is configurable and which limitlessly develops as per social and legal parameters. The death triggered device is configured to send reminder at a regular interval to the user; so, the wearer keeps the set up updated, like his or her will. In the update situation, the user also updates his baseline health and biometric parameters, which might change due to ageing and or any health issues, whether natural or accidental. As mentioned above, the primary sensor detecting a state of life is equally capable of sensing a stable state of life and an unstable state of life. As the death triggered device senses the unstable state of life, the death triggered device prompts the user to make any changes, and digitally authorizes an amended will by way of a secure digital signature authenticated by the user and thus prevents the prevailing situation of depriving people from making changes due to current laws and practices. A preferred embodiment would not need any witnesses at all. As a variation, the user possesses a "Will authorization digital signature combination" which includes his or her secure digital signature coupled along with two additional secure digital signatures of persons having pre-agreed to put this "Will authorization digital signature combination". On invocation of this will authorization digital signature combination by the user, which is only and only for this specific purpose, the death triggered device also sends a notification to the witnesses, and the witnesses are to acknowledge and accepting this invocation. In an event the acknowledgement(s) arrives AFTER the user has breathed his or her last, the will may be considered legally invalid. The death triggered device anticipates and can be configured as per laws and practices for the time being in force.

In some countries, one-time passwords are introduced to prevent financial transactions from pilferage and phishing. Such onetime passwords are sent on a registered mobile number or a registered email ID. The death triggered device is configurable to pick such security password from any such source device, like a smart mobile phone of the user. This configurable feature is particularly configured for the unstable state of life.

In the test situation, the user can invoke the death triggered device to simulate trial actions. The trial actions are a reversible set of activities which are intended to verify that the death triggered device is appropriately configured and is functional in the run mode.

In the run situation, the death triggered device in the active mode performs different functions in a peace time and a crisis time. In the crisis time invoked by the unstable state of life, the death triggered device manages events and instructions pre-configured in the set up and update mode. The instructions particularly are legal documentation and online banking transactions and all such instructions which are legally void as soon as the device detects a state of death. In the crisis time invoked by the state of death, the death triggered device manages post death events and instructions pre-configured in the set up and update mode. The instructions particularly are messages and non-legal/non-financial documentation and transactions and all such instructions which manage a post death set of events including messaging an identified set of persons, organ donation agencies pre-registered by the user, funeral and cremation actions as per religious and social practices and wishes of the user.

Availability of the electrical energy to the death triggered device is as crucial as to any lifesaving medical device and so is the method and system to charge a battery of the death triggered device. The interlocked charging port of the death triggered device as per the present invention anticipates and addresses this need. The interlocked charging port assembly comprises an energy receiver port and an energy delivery device. The energy receiver port is disposed on the death triggered device while the energy delivery device is external to the death triggered device.

The energy receiver port has a polarized construction such that the corresponding energy delivery port of the energy delivery device is mechanically attachable only in a pre-scribed orientation. This feature ensures that the ports cannot be connected in an incorrect electricity polarity. The energy delivery port once mechanically attached cannot be pulled out in any direction other than in a direction towards the user, when worn by the user in his or her left hand. In a worn situation the receiver port is situate on an arm side of the user and NOT on the palm side.

For wearing on right hand and particularly for persons with left hand more active, the death triggered device still has the receiver port situate on an arm side of the user and NOT on the palm side. The receiver port is a modular unit, insertible on either a left side or a right side of a housing assembly of the death triggered device to be able to ensure that a connecting cord of the delivery port lies on the arm side and does not entangle with a palm fingers of the user.

As a variation, the receiver port is situate on the left side as well as on the right side of the enclosure, electrically connected in a parallel circuit. This arrangement facilitates an extra fast charging of the death triggered device in the crisis time.

A preferred embodiment of the receiver port is externally in a trapezoid shape, having a complementing trapezoid pair of inclined groves. There is a pair of receptacles in an inside of either end of the inclined groves. Correspondingly, the delivery port of the delivery device has a pair of claws. The delivery port is engage-able from the user side and disengage-able only towards the user side.

The receiver port of the death triggered device as per present invention has a provision to collate electrical energy from vicinity and may not need the delivery device at all. As a variation, the delivery device may have a radio transmittable energy capability, whereby the delivery port may not have the connecting cord.

The functions described of the death triggered device are crucial to the person; however, the death triggered device is not intended to be perceived as an emergency aid and usable only in difficult times, lest the user does NOT wear it all the time, which is crucial to achieve the intended services from the present invention. In other words, while the crisis time is when the death triggered device adds its inventive value for the user, the user ought to perceive the death triggered device as an all-time companion, most of the time of use of the death triggered device is the peace time.

In this back drop, the death triggered device as per present invention is a mini assistant and or for online banking, e-commerce and casual gaming in the peace time. The death triggered device in general shows a lazy display in a fun mode including a time clock in different configurations like a digital display, a gaming menu and other entertainment display et cetera, with an inventive feature-clock freeze such that the display of the time clock freezes at and after the death triggered device detects a state of death. The death triggered device may be configured to also communicate the instant of life to death transition to a plurality of pre-configured persons and or institutions.

BRIEF DESCRIPTION OF DRAWINGS

FIG. 11 is an illustrative message sent by the death triggered device in the test situation.

FIG. 14 is a perspective view of a lazy display of the death triggered device, while

DETAILED DESCRIPTION OF INVENTION

The present invention shall now be described with the help of accompanying drawings. It is to be expressly noted that the present invention can be worked with several variations and this description should not be construed to limit the invention in any manner whatsoever.

A death trigger is interpreted throughout this description as a reliable energy signal picked up from a body of a user owning the death triggered device as per present invention. The death trigger includes the reliable body energy trigger picked from the body when the person is not yet medically dead however symptomatically not likely to survive. The death trigger not initiated by the body of the user but initiated by another person or device based on his or her observation and or any database or any other means is not in the objectives of the present invention.

Technologically, sensors capable of picking up such reliable bodily energy signals are constantly getting better and better, trying to match a human instinct!

Figure 1:
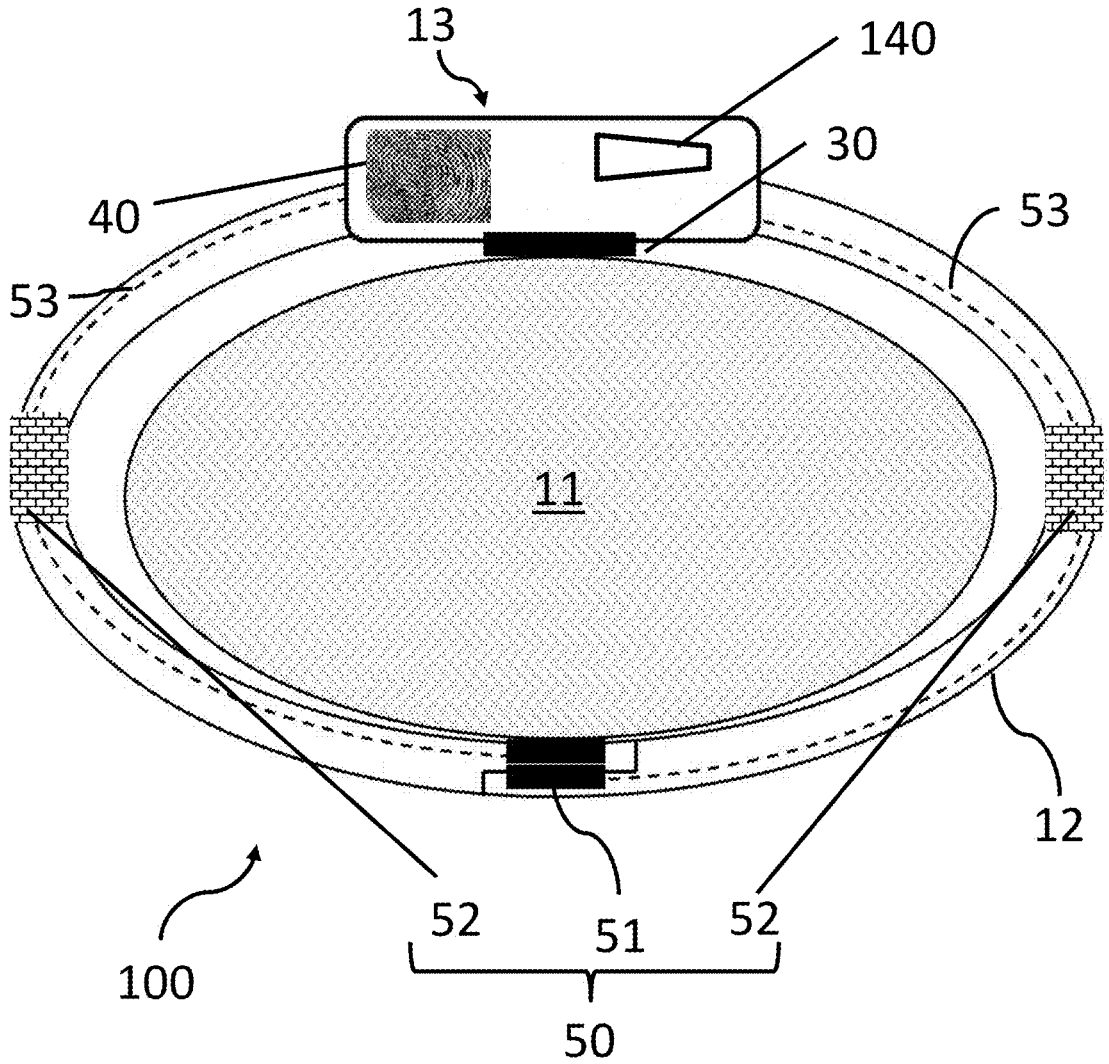
FIG. 1 is a representative view of a death triggered device as per present invention on a wrist of a user.

FIG. 1, 2, 3 of the present invention is a death triggered device (100) having an enclosure (13) supported by a wearable arrangement (12) and is generally always on a body of a user (120), preferably on a wrist (11) or an upper arm. The death triggered device (100) is driven by an electric energy which is supplied and topped up by a receiving port (140) through a chargeable battery cell, and or directly. The death triggered device (100) as per present invention has a provision to collate electrical energy from vicinity as further described below.

The enclosure (13) is suitable for at least an IP 54 class of ingress protection and is suitable for outdoor use. The enclosure (13) houses a hardware which is developed specific to this application keeping lower power consumption, smallest size and optimum speed of execution as per the present invention, which is achieved by an embedded electronics circuitry (20) having an internet communication capability and equipped with a navigation keys and comprising an 8 bit-microcontroller, illustratively ATmega328 or ATmega2560 which is a low power, CMOS 8-bit microcontrollers based on the AVR® enhanced RISC architecture, wherein by executing instructions in a single clock cycle, the death triggered device (100) achieves CPU throughput approaching one million instructions per second (MIPS) per megahertz, allowing the system designer to optimize power consumption versus processing speed, driving a 128×64 pixels OLED display and sensors as described illustratively below. Important to note that the death triggered device (100) is required to function in a steady, validated and reliable manner with a minimum power, and wherein a high immunity to electromagnetic interferences is more important than a processing speed. Therefore, high speed processors consuming proportionate power rapidly, available as a general-purpose hardware, are not appropriate.

The death triggered device (100) is disposed with a plurality of sensors, grouped into—

(a) A plurality of primary sensors (30).

(b) A plurality of validation sensors (40).

(c) A plurality of mode sensors (50).

The primary sensors (30) monitor a state of life (61) or a state of death (71) of the user. Further, the state of life (61) is monitored for a stable state (102) and an unstable state (101). The stable state (102), as is understood generally, is a healthy medical state of a vital parameters of the user with no medical probability of a natural death in a near future, while the unstable state (101) is an unhealthy medical state of the vital parameters of the user pointing towards a high medical probability of a natural death.

The primary sensors (30) as a preferred embodiment is a pulse sensor that simply counts a pulse corresponding to a heartbeat count of the user. One such low cost sensor, illustratively, is Pulse Sensor—Heart Rate Detector, Product Code: EC-0567, or MAX30102, costing less than two US dollars.

The primary sensors (30) may be an oxygen saturation sensor, a body temperature sensor, a vibration sensor, and likewise any contemporary sensor, and or a combination thereof, which non-invasively detects the state of life (61) and the state of death (71).

The validation sensors (40) identify the user (120) of the death triggered device (100). Since the very objective of the present invention is to provide post death support as per wish and needs of the specific user, the primary sensors are to flawlessly and precisely identify the specific user by a comprehensive set up method and any change of user would be through a validated change of the comprehensive set up. The validation sensors (40) as a preferred embodiment is a biometric sensor including a biometric fingerprint reader, iris, face, voice, sound of a heartbeat, and or a combination thereof. Generally, such sensors read or measure light, temperature, speed, electrical capacity and other types of bodily energies of the user.

The functions of the primary sensors (30) and the validation sensors (40) may be performed by a common sensor. One such sensor is known at least since 2011, used in Nymi wristbands. Nymi wristbands are known to use a cardiac sensor that is capable of sensing the heartbeat pattern differences between individuals, making it a biometric sensor; as well as a sensor differentiating between stable state of life (102), unstable state of life (101) as also state of death (71).

Figure 6:
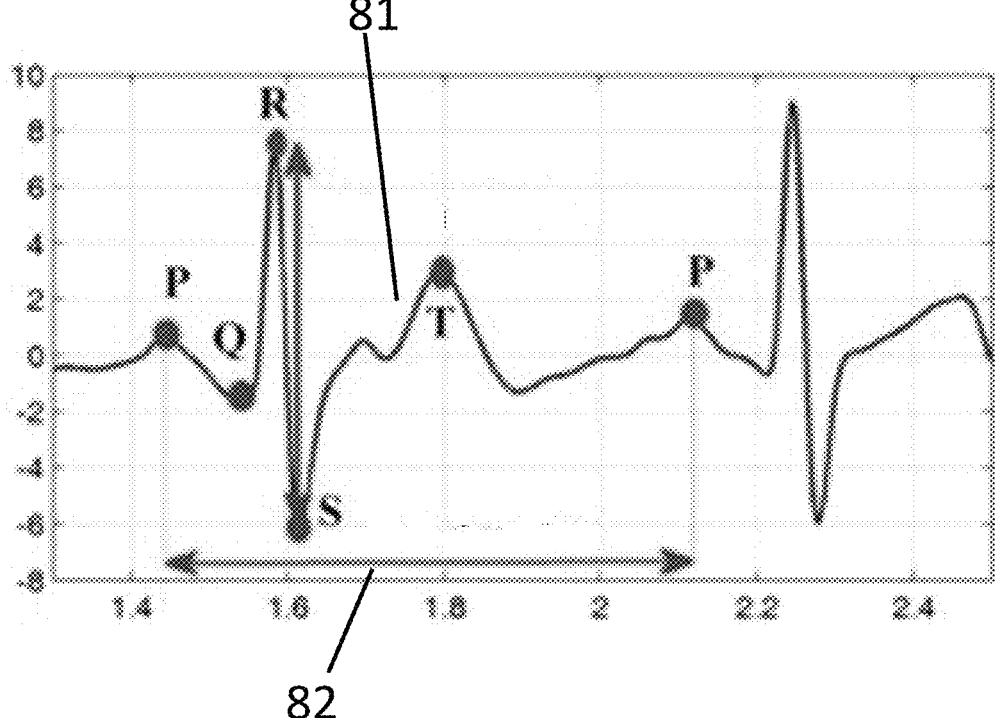
FIG. 6 is a reference cardiogram showing constituents of a cardiographic plot.

FIG. 6 illustratively shows differences in a heartbeat pattern of the user when he is in a different state of health. Example—an ST segment (81) starts drooping down in the event of a myocardial ischemia, and starts rising up indicating a heart attack, while a PP duration (82) varies depending on a rest or an exercised or fever condition.

Figure 5:
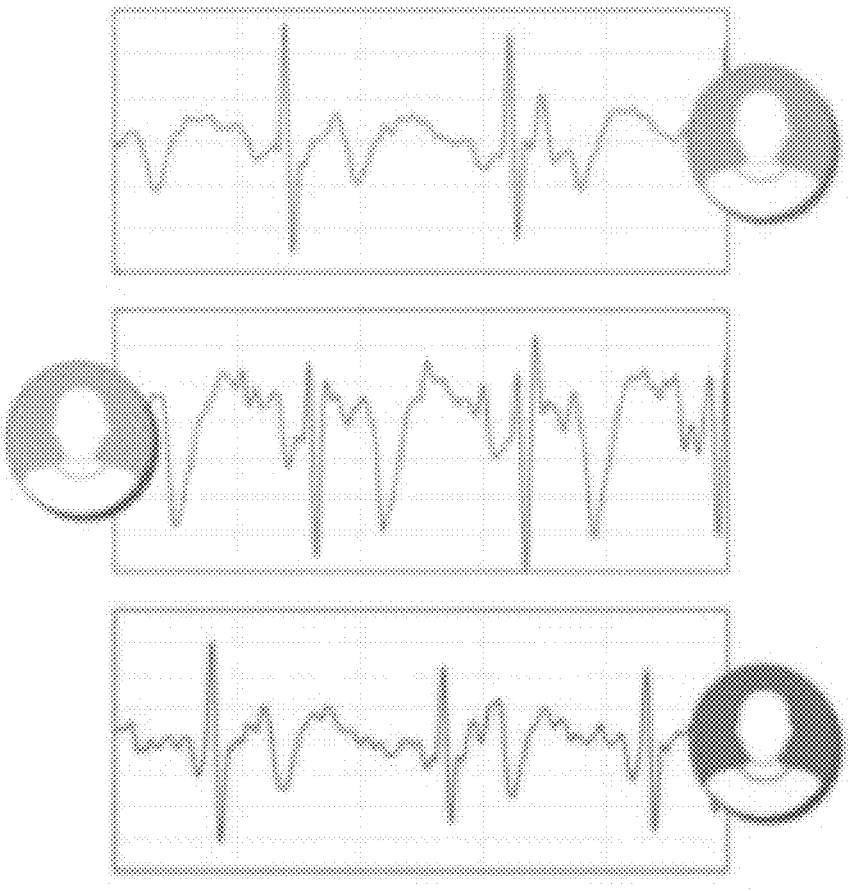
FIG. 5 is an illustrative cardiogram of three different persons having a similar health parameter.

FIG. 5 illustratively shows differences in the heartbeat pattern of different persons even if their heart rate or the PP duration (82) is hypothetically identical.

The mode sensors (50) sense that the death triggered device (100) is indeed worn by the user (120) and is not kept away. This is to differentiate between a state of death (71) of the user (120) and the inactive mode (56) of the device (100). In other words, when the state of life (61) is not sensed, it does not necessarily imply the state of death (71).

Also, mode sensors (50) are essential to interpret "no electric energy" situation of the death triggered device (100), as different from the state of death (71) and or sabotage. On restoration of power by charging, the death triggered device (100) first assumes an inactive mode (56) and thereafter the validation sensors (40) followed by the primary sensors (30) restore the functioning of the death triggered device (100) as explained later below.

The mode sensors (50) in a preferred embodiment is a stretch sensor (52) that stretches when worn by the user. https://leaptechnology.com/product/individual-stretch-sensors/ illustratively describes one such stretch sensor (52). The death triggered device (100) is in active mode (55) when the stretch sensor (52) is stretched, and the electric energy is available. The mode sensor (50) may also be a switching device (51) including a touch and a proximity switching device with or without a biometric sensor, wherein when the switching device (51) is in an OFF state the death triggered device (100) goes in the inactive mode (56); and when the switching device (51) is in an ON state, with the electric energy available and the biometric sensor validating the user (120), the death triggered device (100) goes to the active mode (55). The switching device (51) may be a wired device with a pair of wires (53) running through the wearable arrangement (12).

Figure 2:
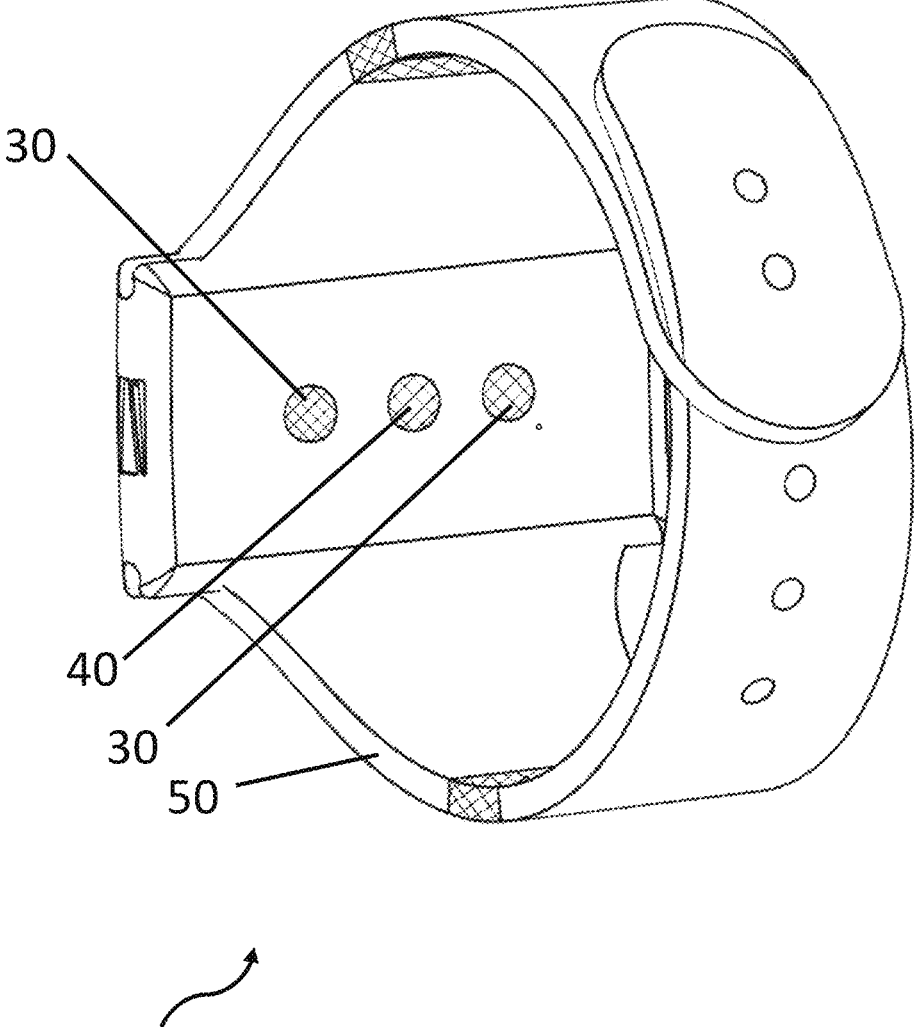
FIG. 2 is a perspective bottom view of the death triggered device with sensors.
Figure 2A:
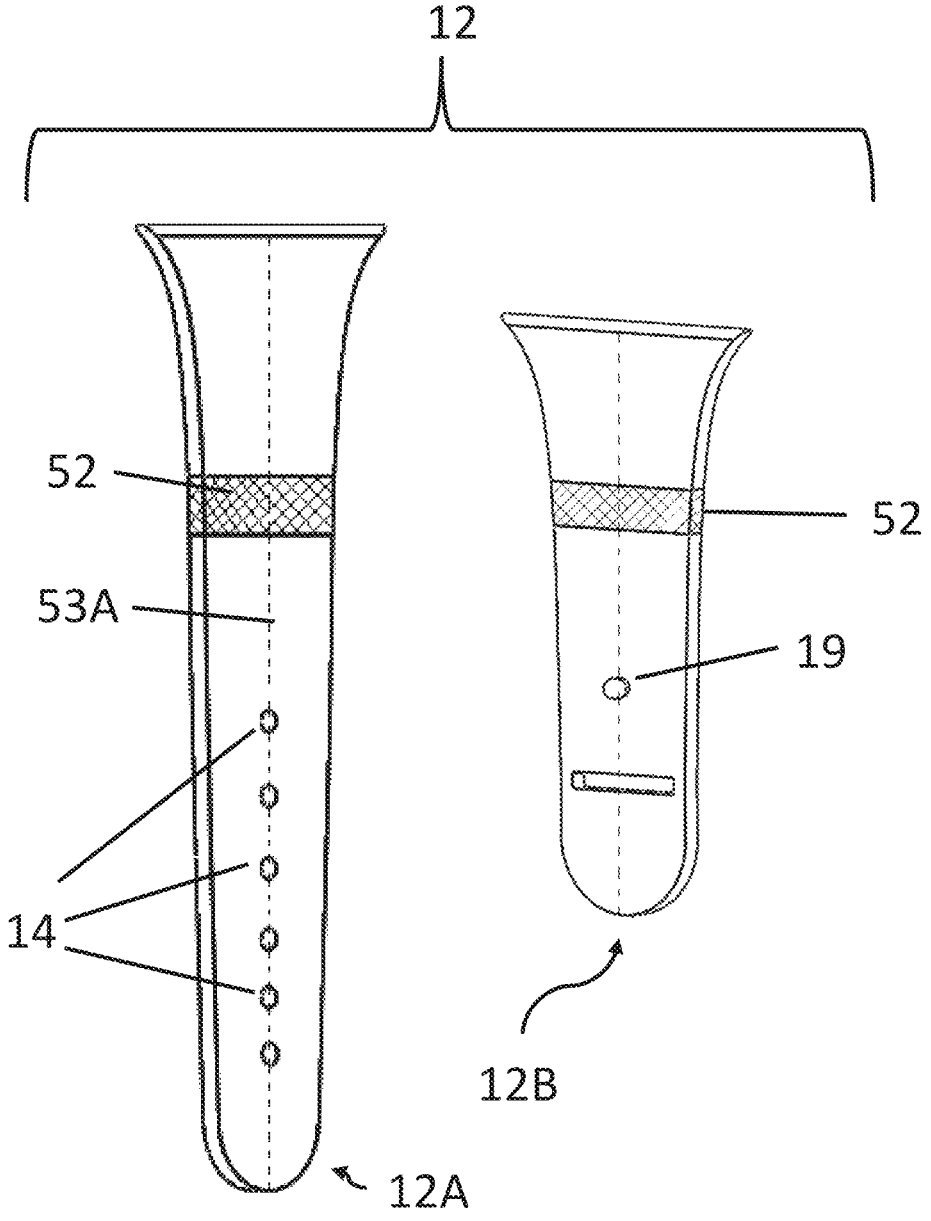
FIG. 2A is a perspective view of two parts of a wearable arrangement.
Figure 2B:
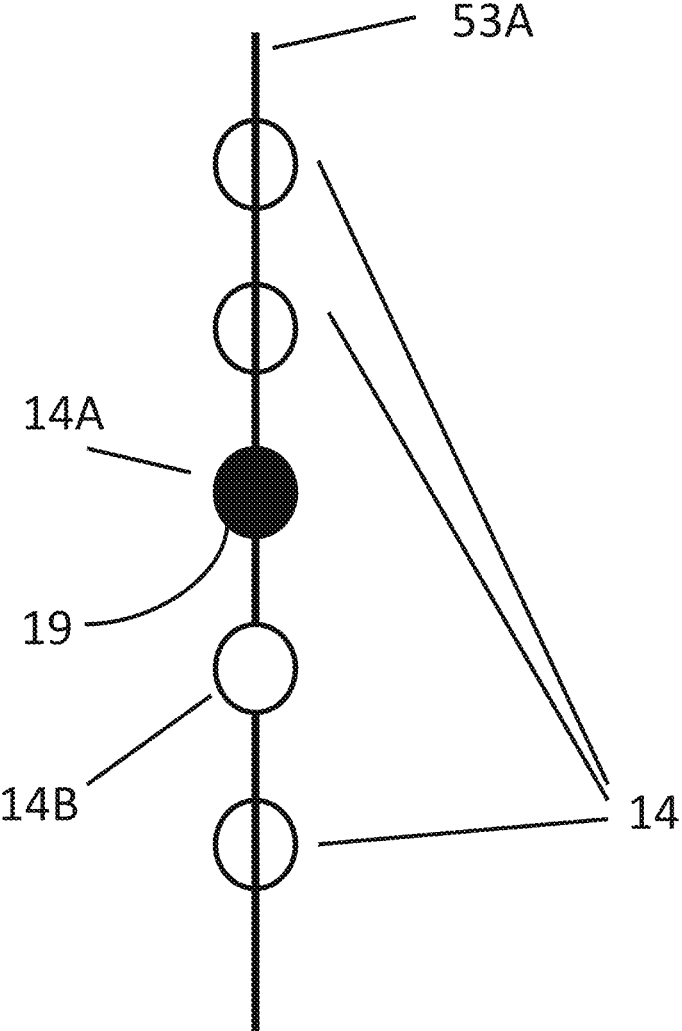
FIG. 2B is a schematic view of a wire of a switching device.
Figure 3:
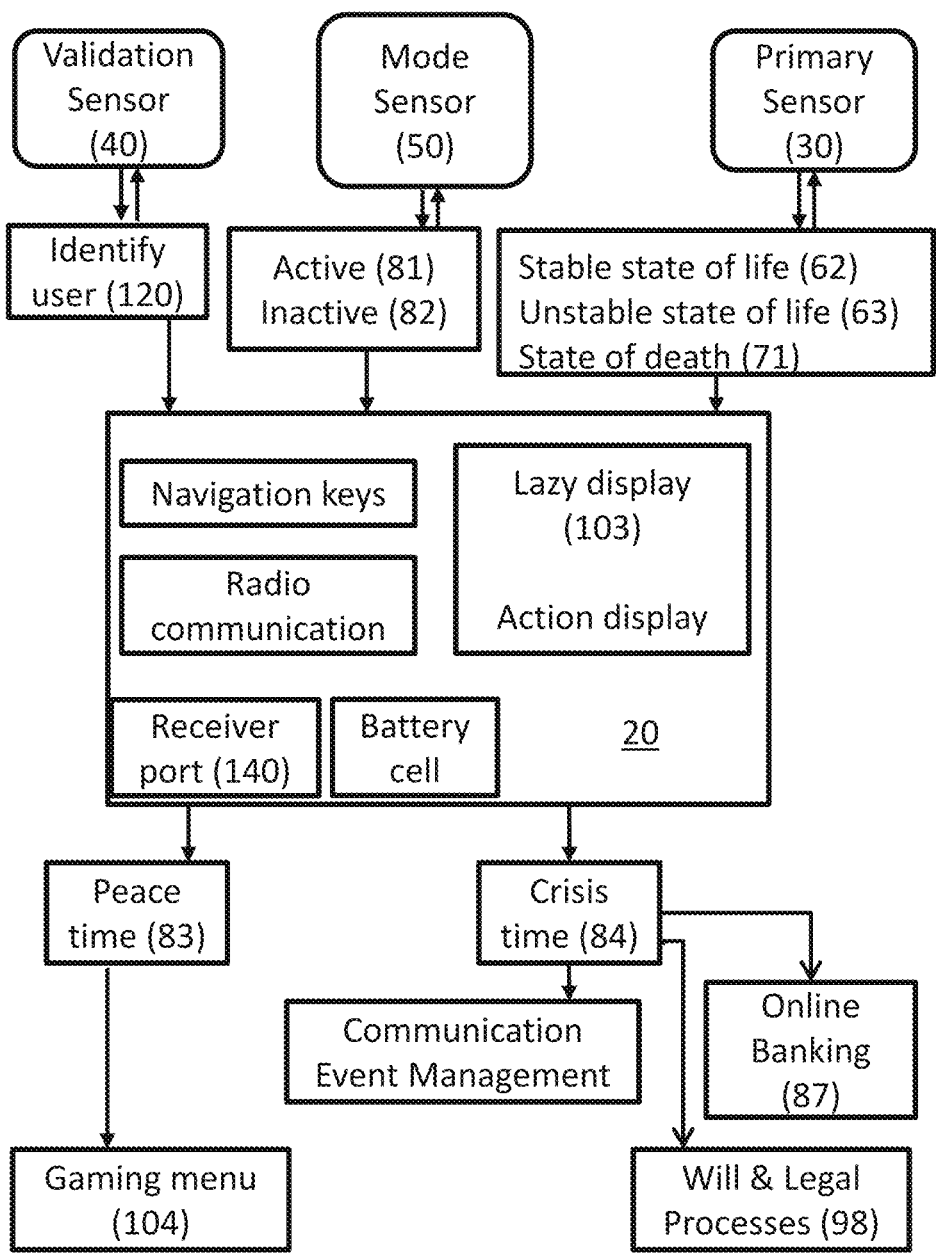
FIG. 3 is a block diagram of key hardware and executions of the death triggered device.

FIG. 2A, 2B, as a variation, at least one wire (53A) of the pair of wires (53) runs through a plurality of strap holes (14) provided on a part one (12A) of the wearable arrangement (12) such that a conducting plug (19) provided on a part two (12B) of the wearable arrangement (12) snaps the wire (53A) while engaging in the selected strap hole (14A) while the conducting plug (19) itself acts as a shorting link to provide an electrical continuity. This inventive feature acts as a secondary "mode & verification" sensor combination in that if any person other than the user (120) attempts to wear the death triggered device (100) by locking the conducting plug (19) in some other hole (14B), then the electricity continuity is snapped again and the switching device (51) remains in the switch OFF state.

It is to be expressly understood that the present invention is not about inventing a sensor but is a device, method and system for triggering and executing data, messages, online banking transactions and legal procedures with minimal intervention or support of family, relatives and or friends of the user (120) who is deceased. Newer sensors in conceptual stage of commercialization, smaller in physical size and with higher resolution are well within the possible variations as per present invention as far as they are non-invasively biometric in principle. Illustratively, hair, skin, body fluid based biometric sensors deployable as the primary sensors, the validation sensors and the mode sensors are anticipated and are integral part of the present invention.

When the death triggered device (100) is in the active mode (55), as per the preferred embodiment, the user (120) selects out of the following situations:

A set up situation (70)

An update situation (72)

A test situation (80)

A run situation (90)

Figure 8:
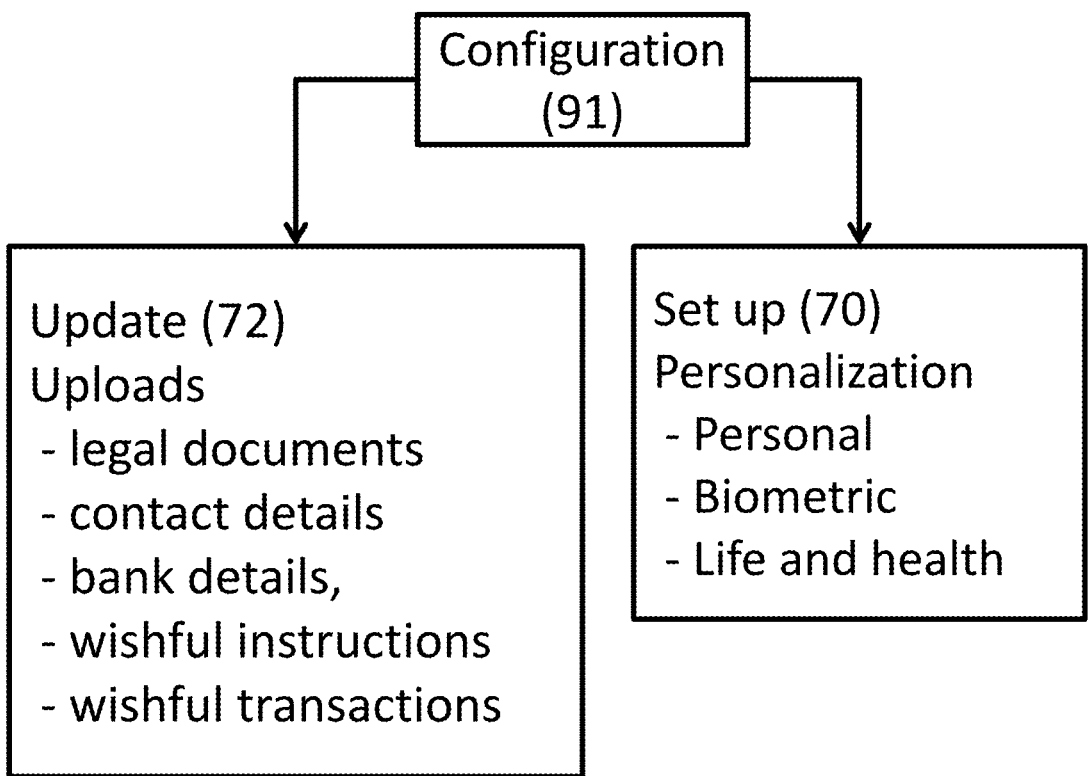
FIG. 8 is a block diagram of configurations of the death triggered device.

Configuration (91)—FIG. 8, in the set up situation (70) and the update situation (72), the death triggered device (100) is configured. In the set up situation (70) which is a first time set up situation, the death triggered device (100) is configured for a personalization—a personal details and credentials, a biometric parameters and a life and health parameters of the user (120). The user (120) accesses the set up situation (70) by using the manufacturer supplied pass codes and changes them to his or her own secret codes. The death triggered device (100) is set up by wearing by the user (120) so that the validation sensors (40) of the death triggered device (100) pick and store the biometric parameters of the user (120). Next the primary sensor (30) picks and stores as reference the life and health parameters of the user (120).

In the update situation (72), the user (120) uploads legal documents, contact details, bank details, wishful instructions and wishful transactions. The scope of this feature of the present invention is configurable and which limitlessly develops as per social and legal parameters. The death triggered device (100) is configured to send reminder at a regular interval to the user (120); so, the wearer keeps the set up updated, like his or her will. In the update situation (72)

the user (120) also updates his baseline health and biometric parameters which might change due to ageing and or any health issues, whether natural or accidental.

"Will" and legal processes (98)—It involves legal documents and primarily includes a "valid will" of the user (120). In many countries a valid will implies a document manually signed by the testator, here user (120), in a healthy state of mind, and witnessed by two or three contactable persons, one of whom preferably is a medical practitioner. The user's signature must be made or acknowledged in the presence of two/three witnesses. The witnesses must be present at the same time, and must also attest and sign the Will.

Just to understand the significance of "validity" of a will, it might be sufficient here to refer that, in the case of Payne v Payne, the Court of Appeal in the UK considered the validity of a Will where the two witnesses had written their names in block capitals, rather than "signing" in the commonly accepted sense of making an identifiable, unique personal mark. Initially, the Judge decided that the Will had not been properly attested and was invalid. However, the Court of Appeal decided that a "signature" in the commonly accepted sense was not required, and that it was sufficient for the witnesses simply to write their names with the intention of attesting the Will. Therefore, the Will was declared to be valid.

To further give an update, The Sunday Times of 30 Jul. 2020 carries a News that wills witnessed via video link will be legally valid henceforth, which was hitherto only a concession given under the Wills Act 1937, for and during Covid-19 pandemic.

In a dynamic world, the legal practices are evolving and Covid-19 pandemic has forced the rule makers to more and more accept electronic documents. The present invention particularly addresses a situation wherein a terminally ill person wishes to make "last minute" changes in his or her will; and this situation is triggered by newer realizations as one is on his way to heavenly abode; a feeling most others cannot appreciate unless they have seen "death" from as very close angle! The present invention recognizes that intensely verified digital signatures are now accepted almost in every transaction including financial transactions and it is not irrational to extend this technology for accepting a will digitally authorized as a legally valid will.

Figure 4:
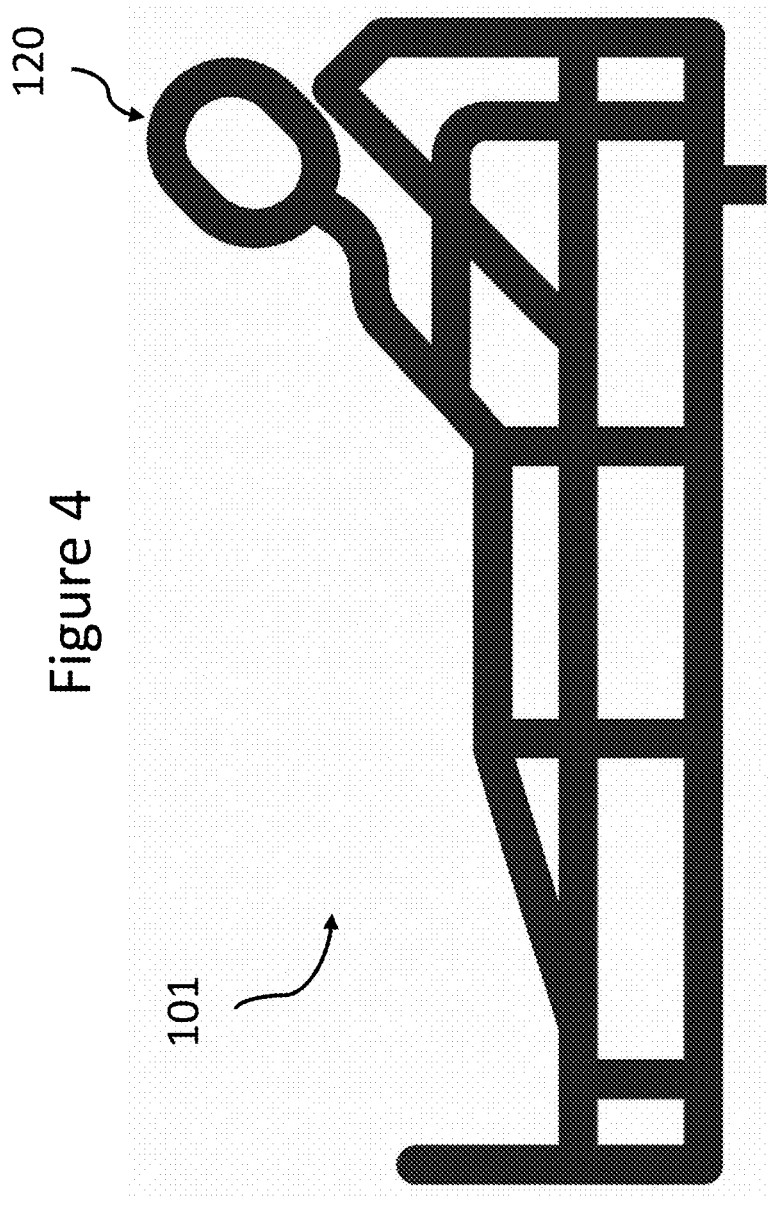
FIG. 4 is a representative view of the user in an unstable state of life.

As mentioned above, the primary sensor (30) detecting a state of life (61) is equally capable of sensing a stable state of life (102) and an unstable state of life (101). The stable state (102), as is understood generally, is a healthy medical state of a vital parameters of the user (120) with no probability of a natural death in a near future, while the unstable state of life (101) is a unhealthy medical state of the vital parameters of the user (120) pointing towards a high medical probability of a natural death and or a major capabilities deterioration like in a paralysis or a stroke, medically termed as a plegia, including but not limited to cardioplegia (paralysis of heart), hemiplegia (paralysis of one side of body), paraplegia (paralysis of legs), and quadriplegia (paralysis of all four extremities), while FIG. 4 is merely a reference illustration showing the user (102) as incapacitated.

Figure 7:
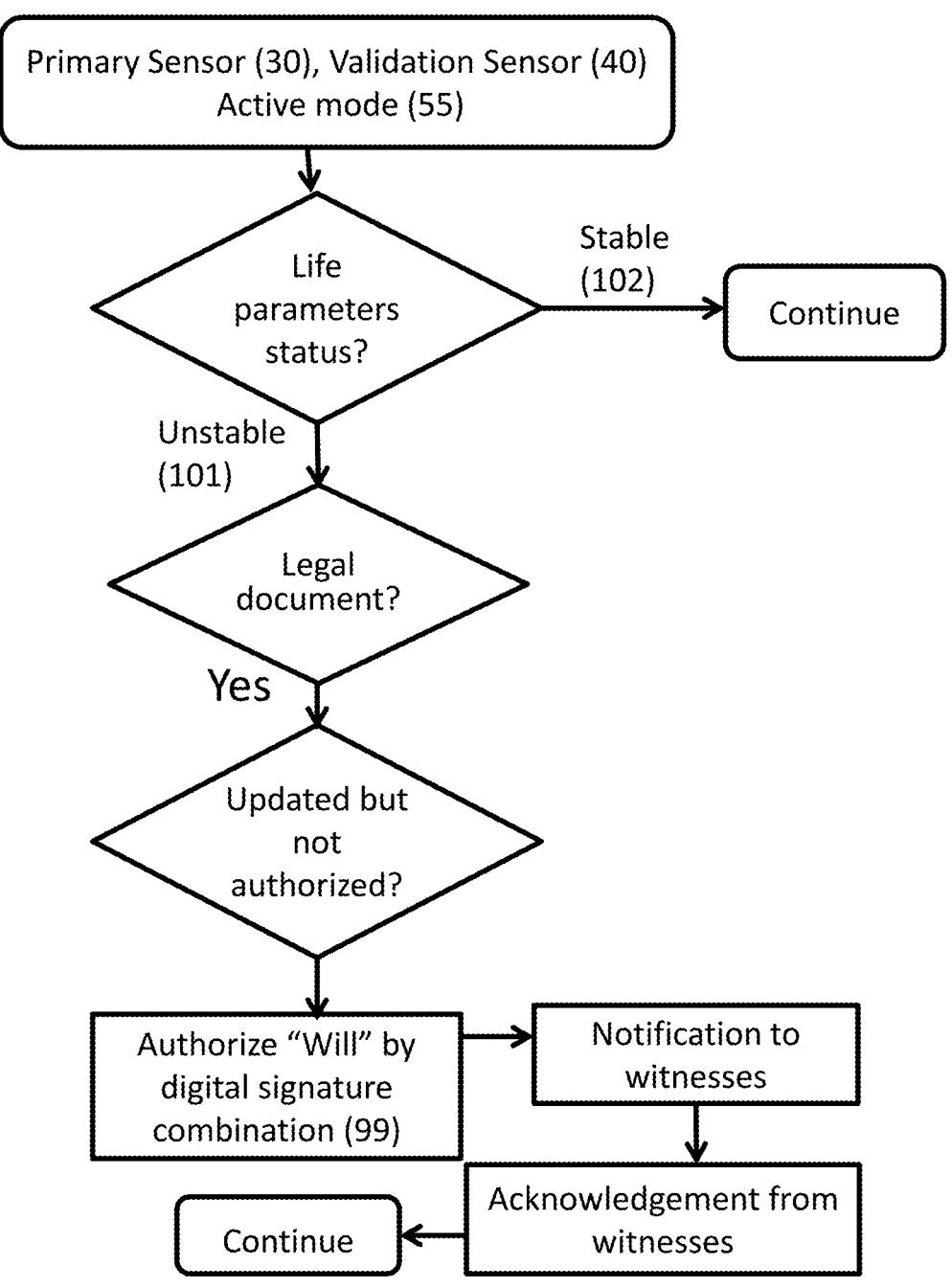
FIG. 7 is a flow diagram of execution of a "will" by the death triggered device.

FIG. 7, as the death triggered device (100) senses the unstable state of life (101), the death triggered device (100) prompts the user (120) to make any changes, and digitally authorizes an amended will by way of a secure digital signature authenticated by the user and thus prevents the prevailing situation of depriving people from making changes due to current laws and practices. A preferred embodiment would not need any witnesses at all. As a variation, the user (120) possesses a "Will authorization digital signature combination" (99) which includes his or her secure digital signature coupled along with two additional secure digital signatures of persons having pre-agreed to put this "Will authorization digital signature combination" (99). On invocation of this will authorization digital signature combination (99) by the user (120), which is only and only for this specific purpose, the death triggered device also sends a notification to the witnesses, and the witnesses are to acknowledge and accept this invocation. In an event the acknowledgement(s) arrives AFTER the user has breathed his or her last, the will may be considered legally invalid. The death triggered device anticipates and can be configured as per laws and practices for the time being in force.

A contact details is a database of persons and agencies for appropriately and selectively communicating death news and post death event.

Bank details pertain to those bank transactions that the user wishes to initiate when he or she is in the unstable state of life (101), or soonest after his or her death.

There is an element of legal discrepancy involved here with respect to current practice. There are known cases of people leaving blank signed cheque leaves and it is possible that those cheque leaves are used after demise of the user (120) by falsely dating them, say a day earlier than the death. The present invention facilitates such bank transaction when the user is still alive and wishes to utilize some of his or her funds in a manner he wishes. In the event of the user in the unstable state of life, the pre-identified bank transactions can be triggered by the user by accepting a prompt from the death triggered device. This invention facilitates the user to keep such transaction in abeyance and at the same time need not leave signed cheque leaves and reduce his risk as well as eliminate legal irregularity.

In some countries, one-time passwords are introduced to prevent financial transactions from pilferage and phishing. Such onetime passwords are sent on a registered mobile number or a registered email ID. The death triggered device is configurable to pick such security password from any such source device, like a smart mobile phone of the user (120). This configurable feature is particularly configured for the unstable state of life (101).

Figure 9:
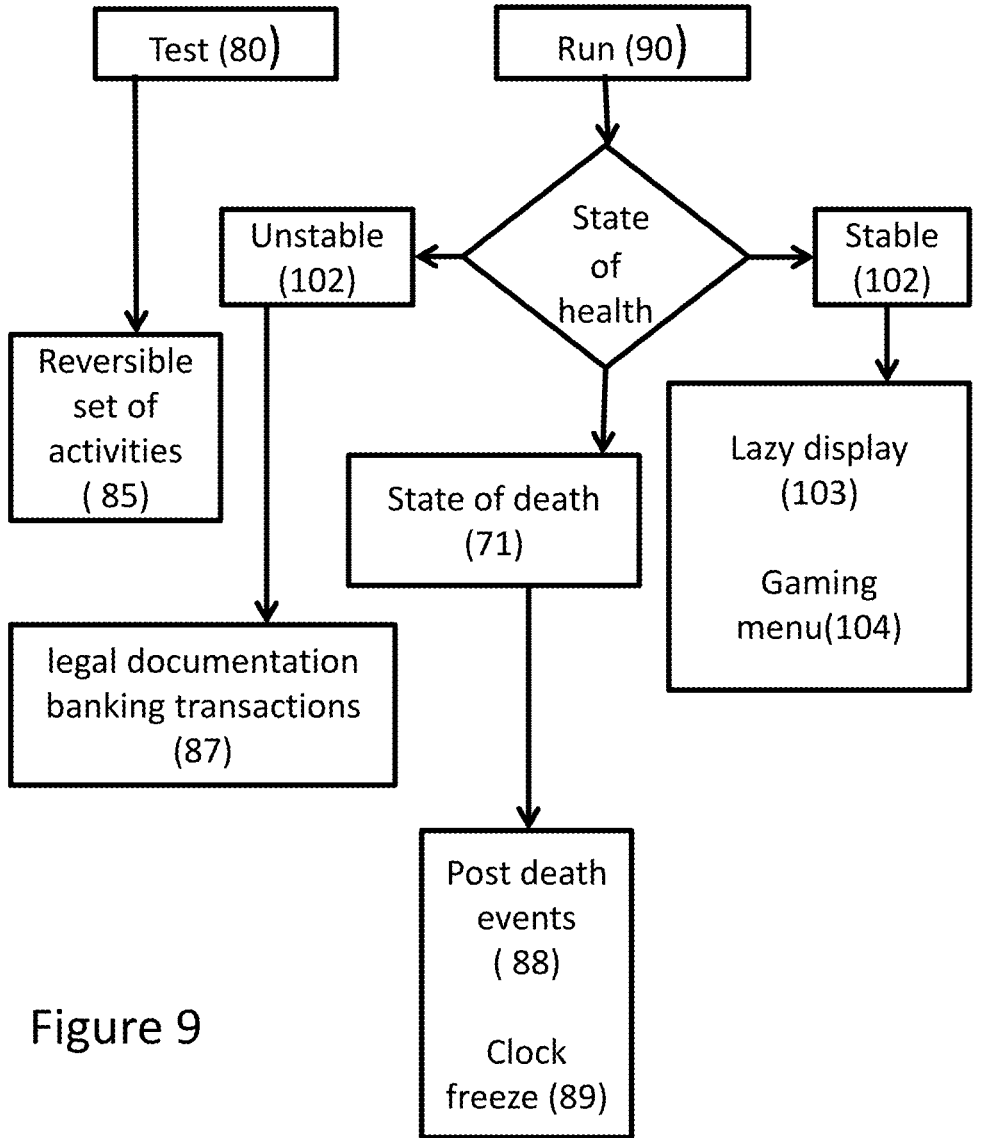
FIG. 9 is a flow diagram of executions in a test and a run situation.
Figure 10:
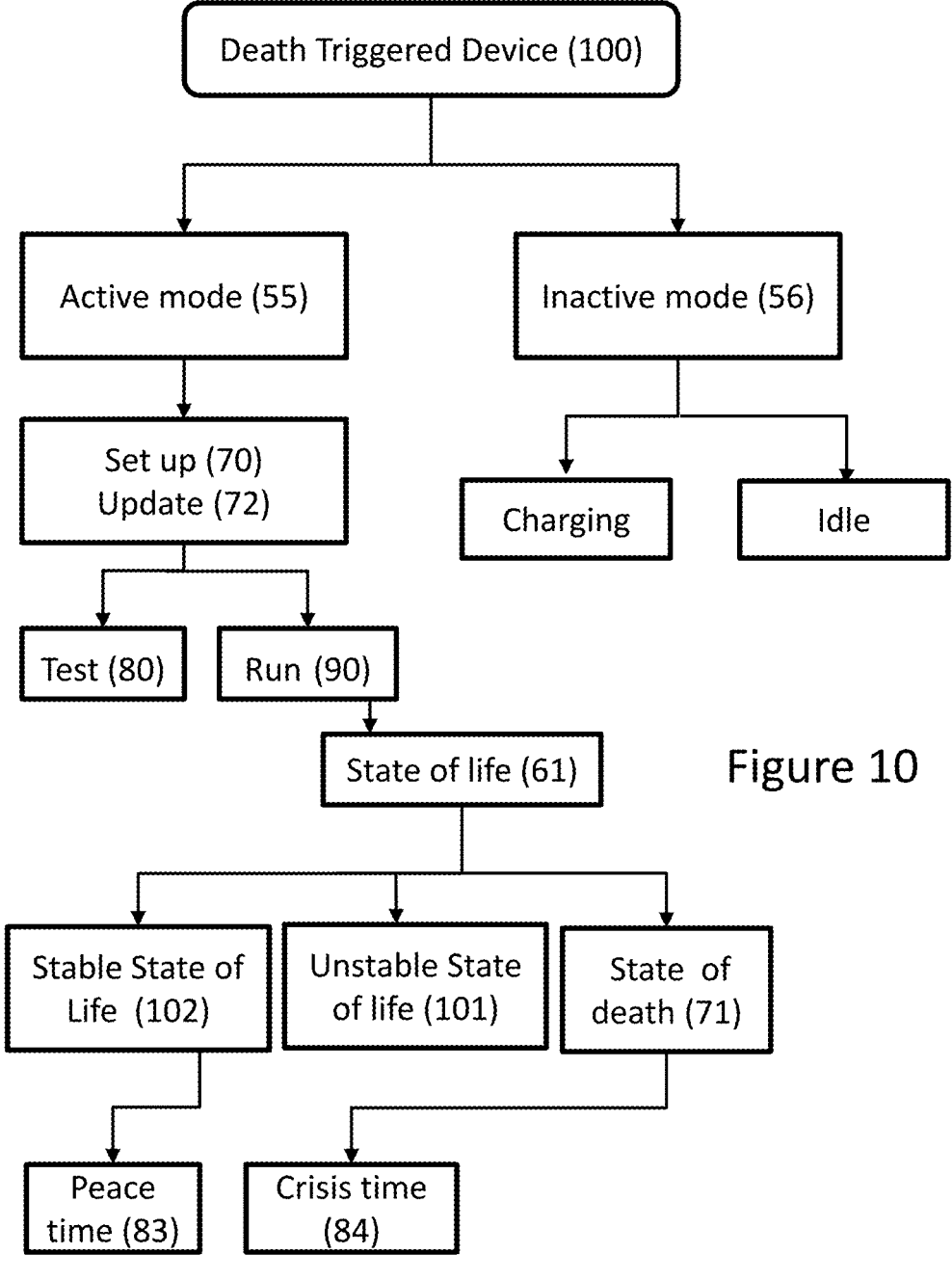
FIG. 10 is a process flow diagram of the system and management of the death triggered device.

FIG. 9, 10, in the test situation (80), the user (120) can invoke the death triggered device (100) to simulate trial actions. The trial actions are a reversible set of activities (85) which are intended to verify that the death triggered device (100) is appropriately configured and is functional in the run mode. FIG. 11 is an illustrative message (86) as one of the reversible set of activities (85).

In the run situation (90), the death triggered device in the active mode (55) performs different functions in a peace time (83) and a crisis time (84).

In the crisis time (84) invoked by the unstable state of life (101), the death triggered device (100) manages events and instructions pre-configured in the set up and update mode. The instructions particularly are legal documentation and online banking transactions (87) and all such instructions which are legally void as soon as the device detects a state of death.

In the crisis time (84) invoked by the state of death (71), the death triggered device manages post death events (88) and instructions pre-configured in the set up and update mode. The instructions particularly are messages and non-legal/non-financial documentation and transactions and all such instructions which manage a post death set of events including messaging an identified set of persons, organ donation agencies pre-registered by the user, funeral and cremation actions as per religious and social practices and wishes of the user.

The death triggered device (100) having the embedded electronics circuitry (20) with internet communication capability executes a set of instructions in the form of a computer program as the death triggered device (100) is on a body of the user (120) and is in an active mode (55), the set of instructions grossly comprising the steps of:

a. Picking up by the validation sensors (40) and storing, the biometric parameters of the user (120), b. Picking up by the primary sensors (30) and storing as reference a life and health parameters of the user (120), c. Receiving in a set up situation (70), a configuration (91) inputs comprising a personal details and credentials, a biometric parameters and a life and health parameters of the user (120), by the user (120) accessing the set up situation (70) by using the manufacturer supplied pass codes and changing them to his or her own secret codes, d. Receiving in an update situation (72), a configuration (91) inputs comprising a legal documents, a contact details, a bank details, a wishful instructions and a wishful transactions. In the update situation (72) the user also updates his baseline health and biometric parameters which might change due to ageing and or any health issues, whether natural or accidental, e. Executing instructions in the crisis time (84) invoked by the unstable state of life (101) pre-configured in the update situation (72), particularly the legal documentation and online banking transactions (87) and all such instructions which are legally void as soon as the device detects a state of death (71), f. Executing instructions in the crisis time (84) invoked by the state of death (71), the post death events (88) and instructions pre-configured in the update situation (72), particularly the messages and non-legal/non-financial documentation and transactions and all such instructions which manage a post death set of events including messaging an identified set of persons, organ donation agencies pre-registered by the user, funeral and cremation actions as per religious and social practices and wishes of the user (120), g. Displaying a reminder at a regular interval to the user (120) to up-date the configuration (91), h. Simulating in the test situation (80) a trial actions, wherein the trial actions are a reversible set of activities (85) intended to verify the death triggered device (100) is appropriately configured and functional in a run mode (90), i. Functioning in the peace time (83) invoked by the state of stable life (102) as a mini assistant and or for online banking, e-commerce and casual gaming in the peace time, showing a lazy display (103) in a fun mode including a time clock in different configurations like a digital display, a gaming menu (104) and other entertainment display.

j. Attempting a radio/internet communication repeatedly till end of electric power and executing an intended communication as soon as the death triggered device (100) finds a communication network, with a time stamp of a first communication attempt.

Data files, pre-recorded messages, documents reside in a non-volatile memory of the death triggered device (100) for faster processing and execution, while the radio/internet communication is invoked only for releasing instructions. As a variation, data files, pre-recorded messages, documents reside on an external device in which case the execution also involves radio/internet communication for transmittal and receiving of processing a plurality of routines of the computer program.

Availability of the electrical energy to the death triggered device (100) is as crucial as to any lifesaving medical device and so is the method and system to charge a battery of the death triggered device (100). The interlocked charging port (130) of the death triggered device (100) as per the present invention anticipates and addresses this need.

The interlocked charging port assembly (130) comprises an energy receiver port (140) and an energy delivery device (160). The energy receiver port (140) is disposed on the death triggered device (100) while the energy delivery device (160) is external to the death triggered device (100).

Figure 12:
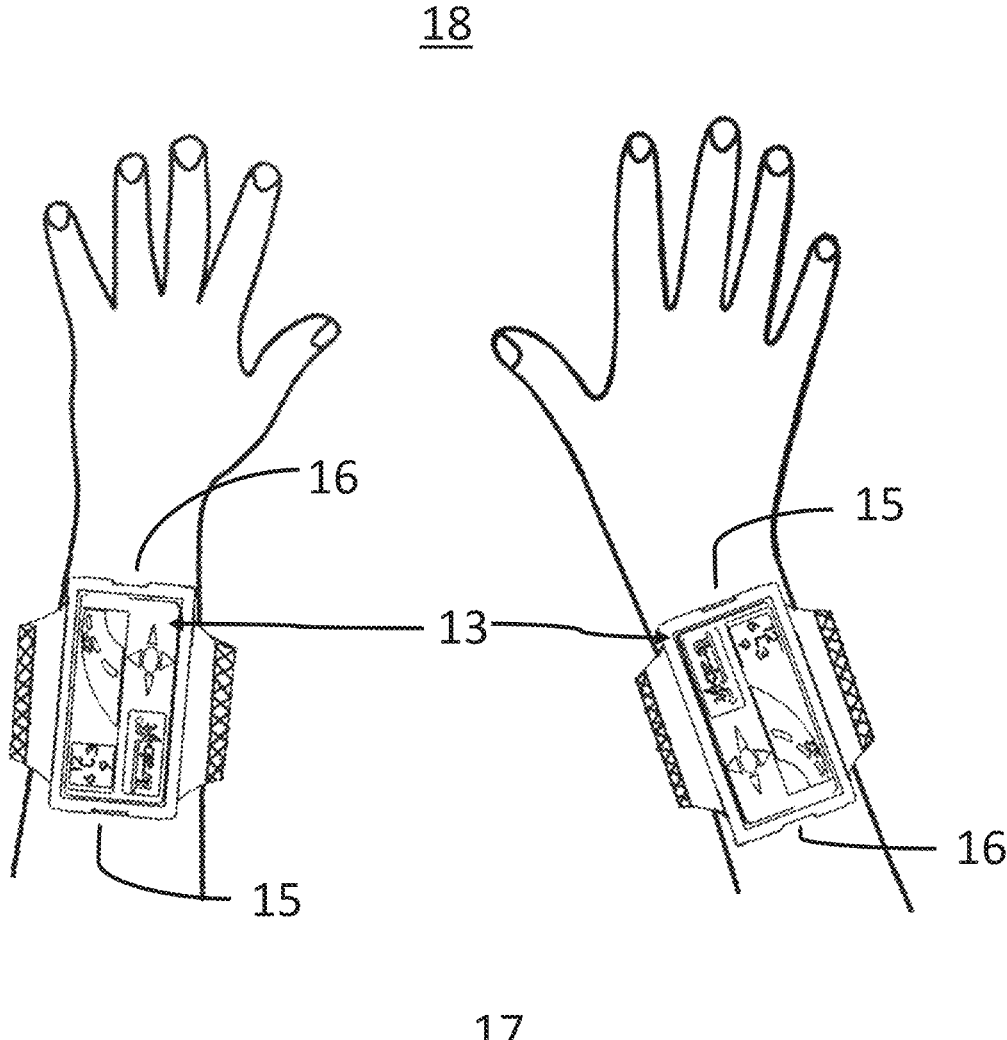
FIG. 12 indicates various reference directions while using the death triggered device.

The energy receiver port (140) has a polarized construction such that the corresponding energy delivery port (161) of the energy delivery device (160) is mechanically attachable only in a prescribed orientation. This feature ensures that the ports cannot be connected in an incorrect electricity polarity. The energy delivery port (161) once mechanically attached cannot be pulled out in any direction other than in a direction towards the user, when worn by the user in his or her left hand. In a worn situation the receiver port is situate on an arm side (17) of the user (120) and NOT on the palm side (18). FIG. 12.

For wearing on right hand and particularly for persons with left hand more active, the death triggered device (100) still has the receiver port (140) situate on an arm side (17) of the user (120) and NOT on the palm side (18). The receiver port (140) is a modular unit, insertible on either a left side (15) or a right side (16) of a housing assembly of the death triggered device (100) to be able to ensure that a connecting cord (162) of the delivery port (160) lies on the arm side (17) and does not entangle with a palm fingers of the user (120).

As a variation, the receiver port (140) is situate on the left side (15) as well as on the right side (16) of the enclosure (13), electrically connected in a parallel circuit. This arrangement facilitates an extra fast charging of the death triggered device (100) in the crisis time (84).

Figure 13:
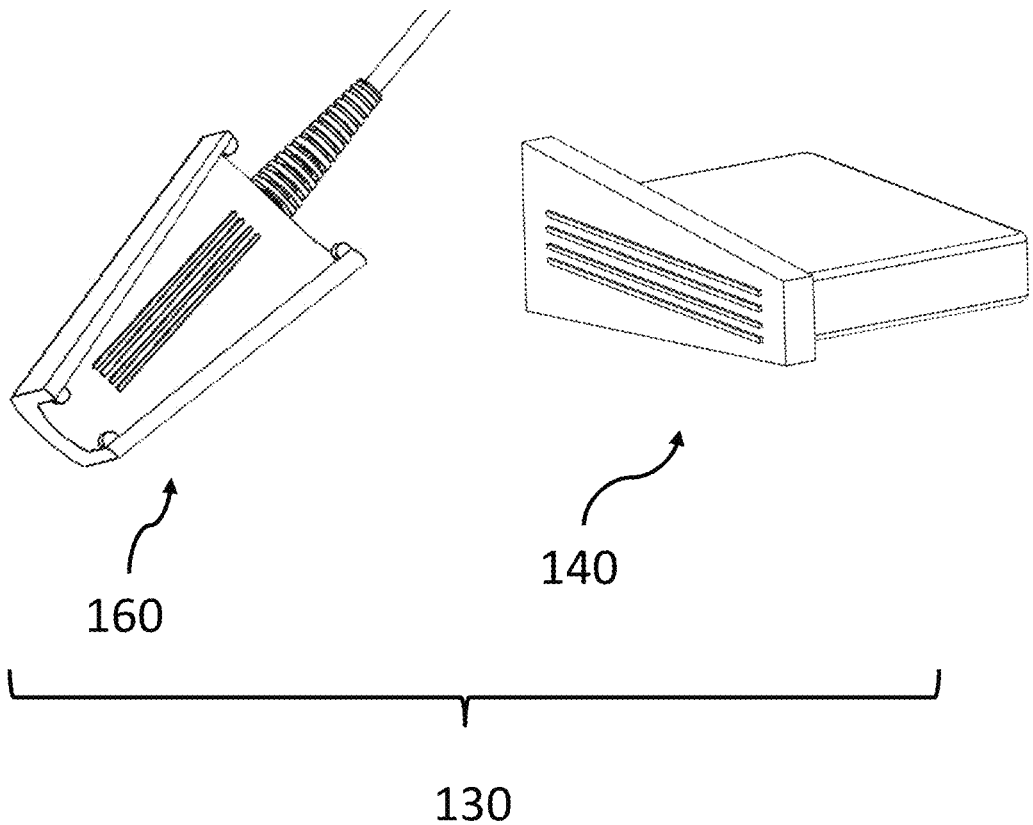
FIG. 13 is a perspective view of an interlocked charging port assembly.
Figure 13A:
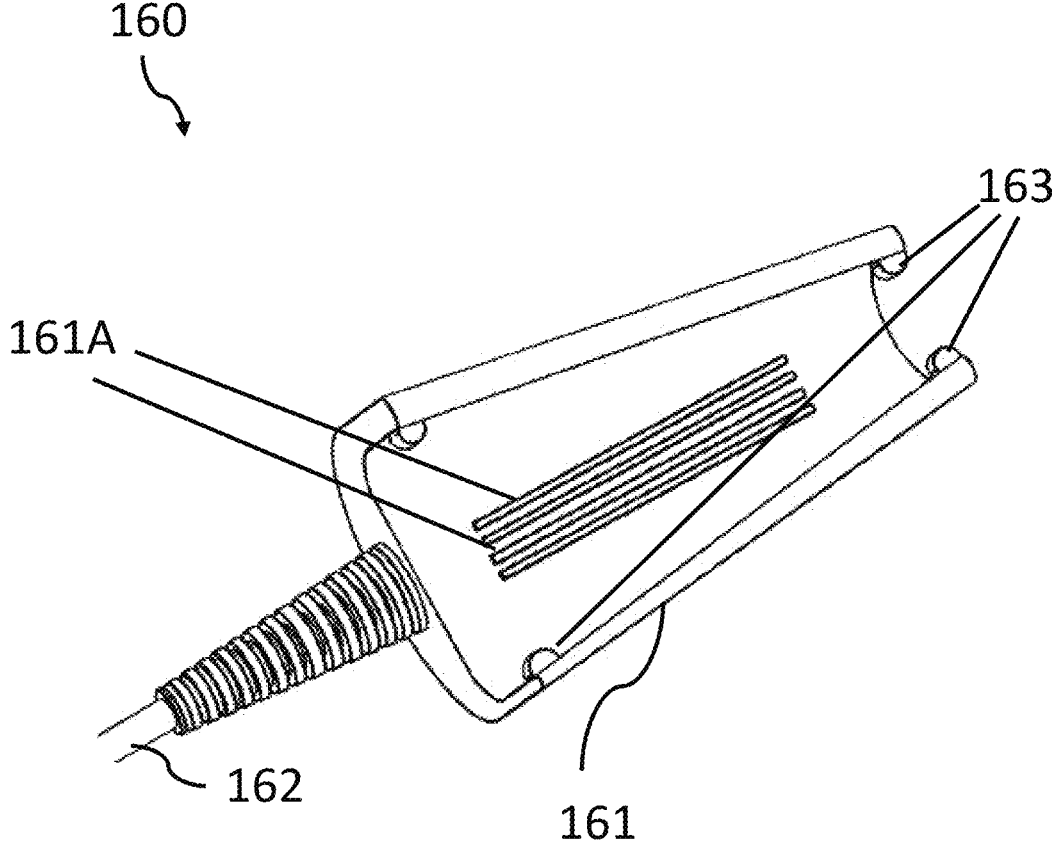
FIGS. 13A and 13B are a perspective view of an energy delivery device and an energy receiver port.
Figure 13B:
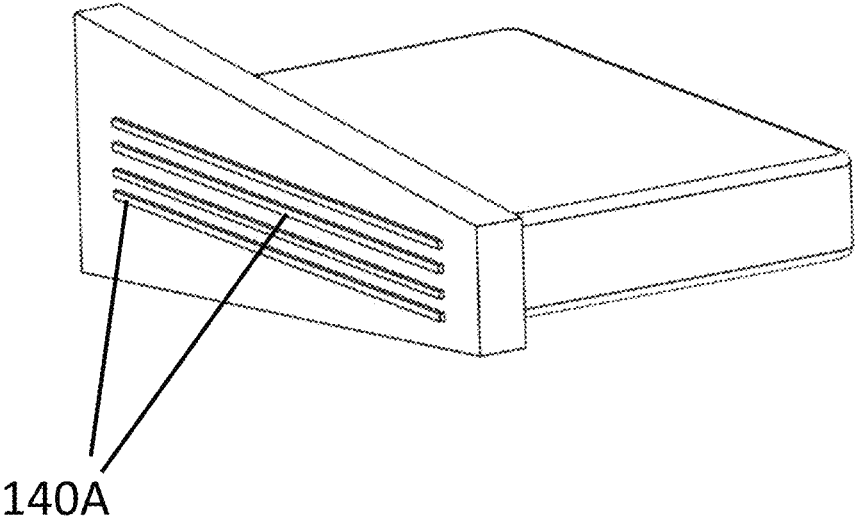
Figure 13B:
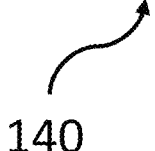
Figure 13C:
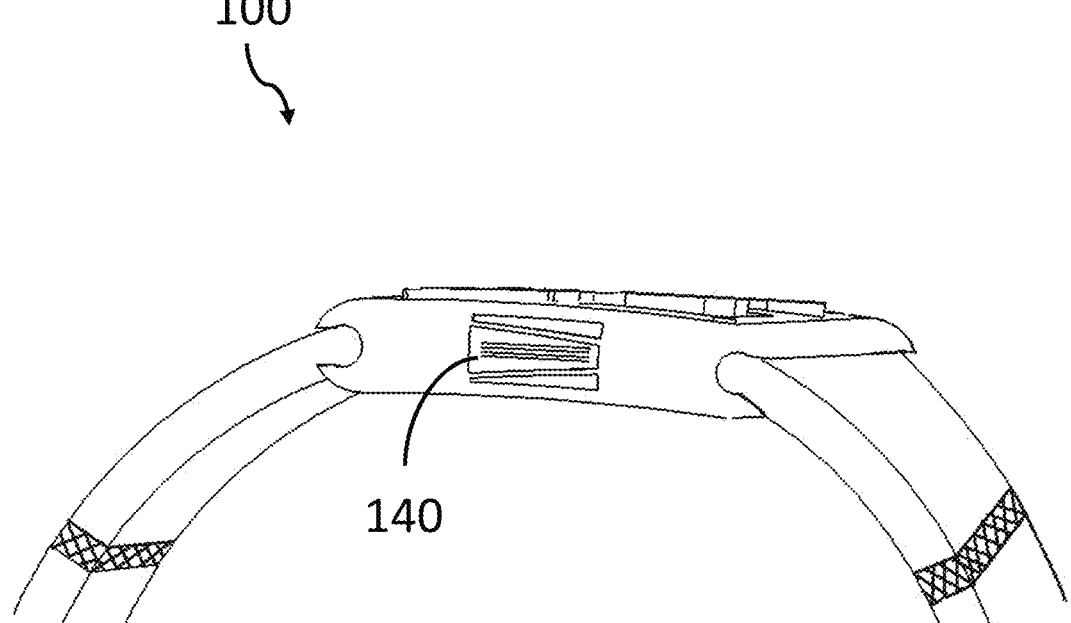
FIG. 13C is a perspective view of the death triggered device with a preferred embodiment of the energy receiver port disposed thereon.
Figure 13D:
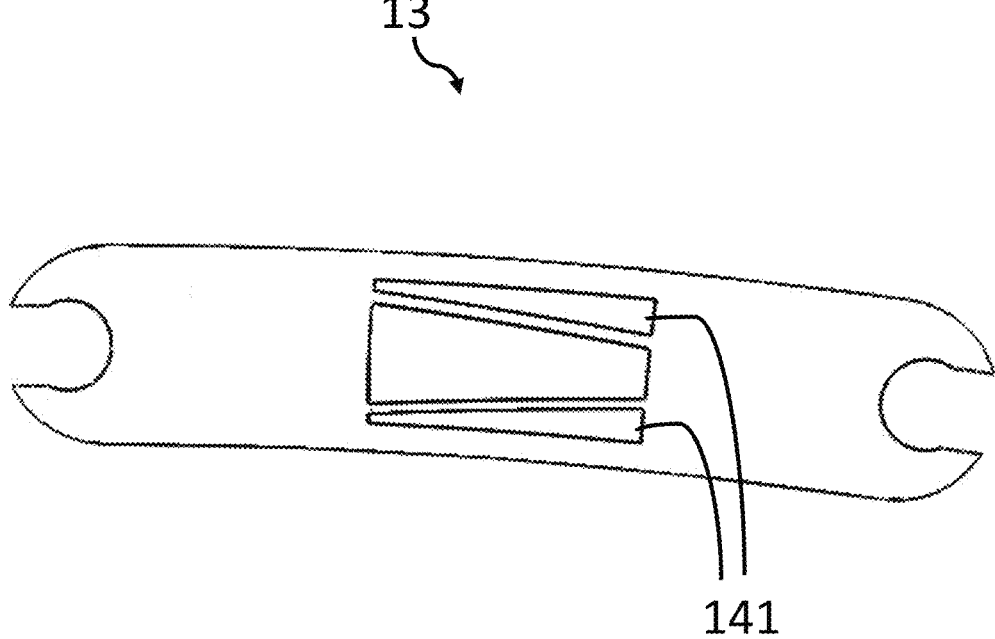
FIGS. 13D and 13E are a close-up perspective views of a locking construction on the enclosure of the death triggered device.
Figure 13E:
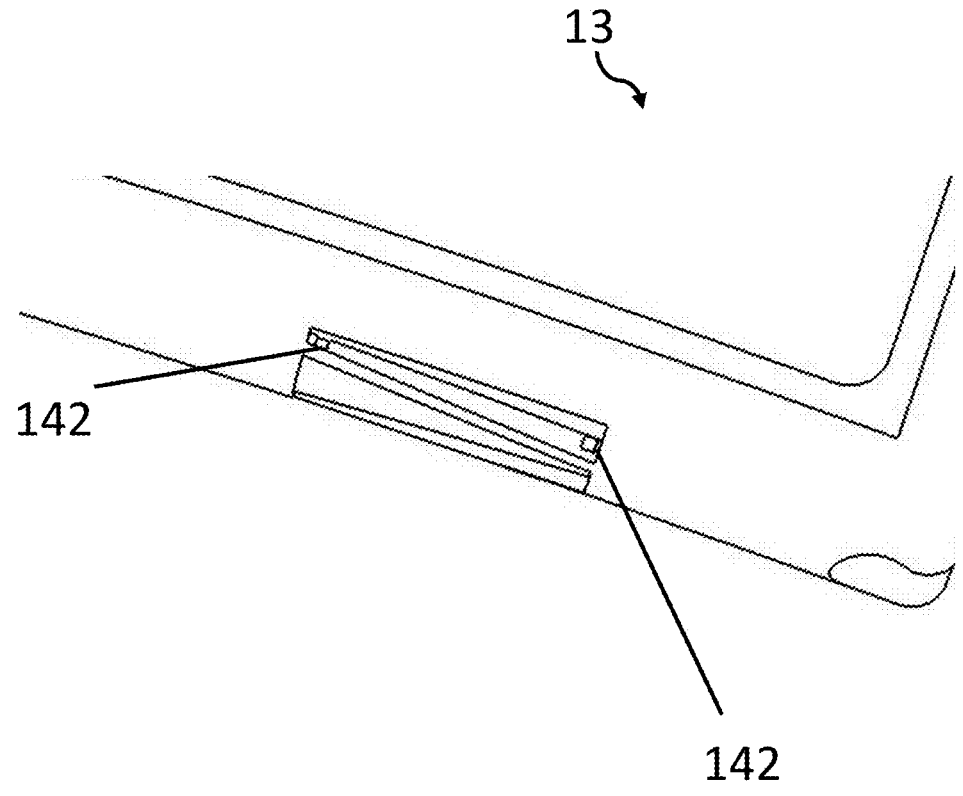
Figure 13F:
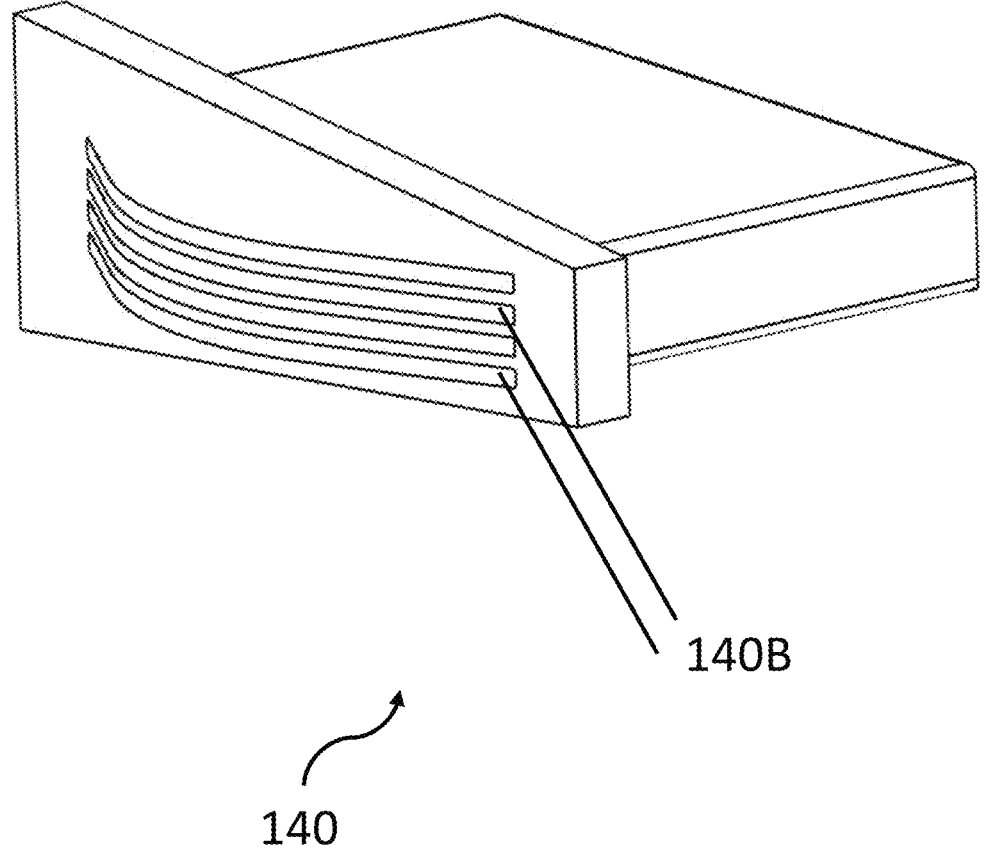
FIG. 13F is a representative view of the delivery tracks with a contact pressure construction.
Figure 13G:
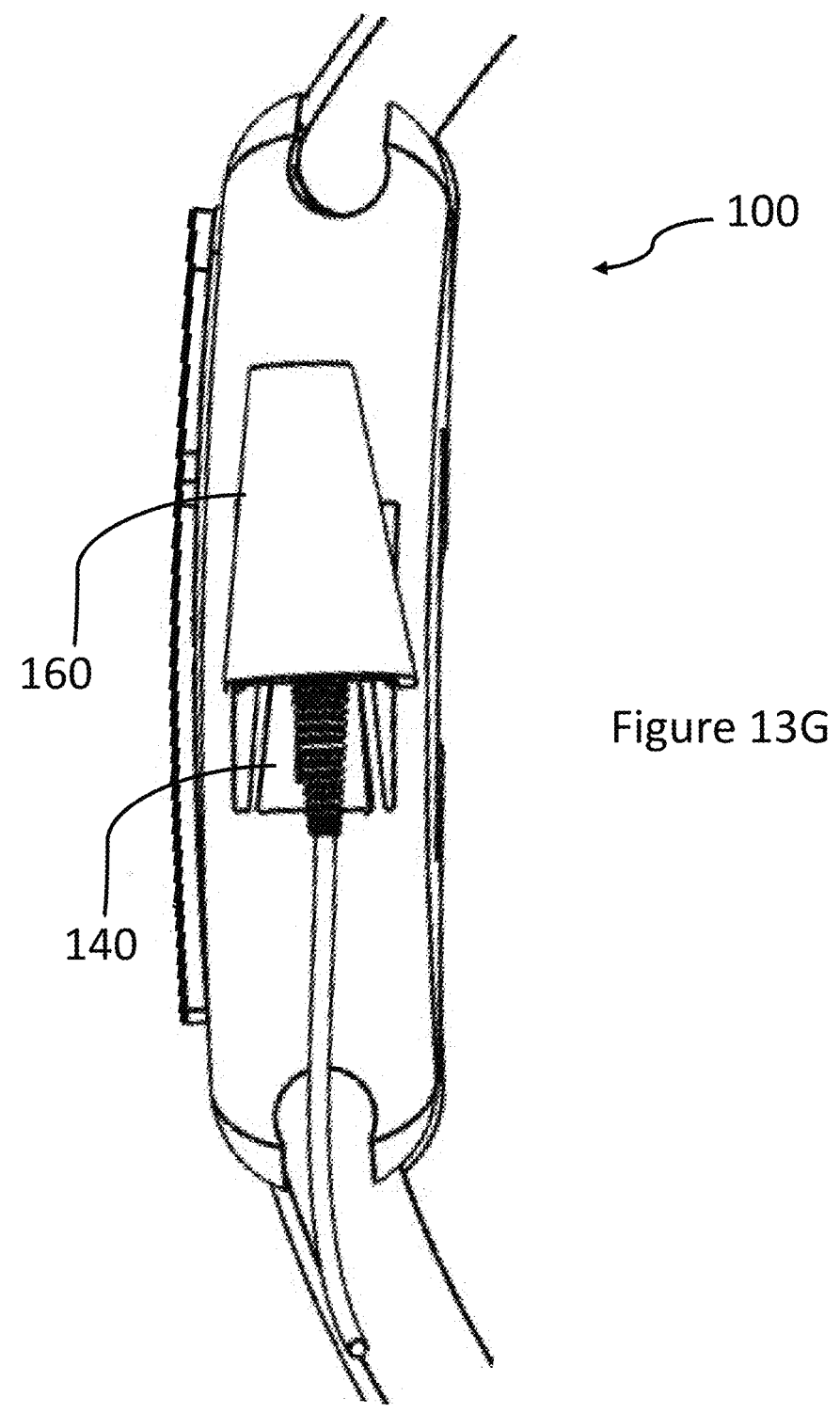
FIG. 13G is a side view with partially assembled/disassembled interlocked charging port assembly.

FIGS. 13 to 13G, a preferred embodiment of the receiver port (140) is externally in a trapezoid shape, having a complementing trapezoid pair of inclined groves (141). There is a pair of receptacles (142) in an inside of either end of the inclined groves (141). Correspondingly, the delivery port (161) of the delivery device (160) has a pair of claws (163). The delivery port (161) is slidably engage-able from the user side and disengage-able only towards the user side. A sliding action for engaging and disengaging the energy port (161) with the energy receiver port (140) causes an mechanical wiping action between a set of delivery tracks (161A) of the energy delivery port (161) and a set of receiver tracks (140A) of the energy receiver port (140). Such mechanical wiping action cleanses the tracks making them free from dirt, dust and also any tarnishing which is essentially an oxide layer that may have formed, like $AgO_2$ or $AuO_2$, resulting in poor conductivity resulting in higher contact resistance, consequently heat generation and contacts deterioration. Either or both of the set of delivery tracks (161A) and receiver tracks (140A) have a contact pressure construction, which improves energy transfer as well as the wiping action. The contact pressure construction may be by a plurality of contact springs, a springy curved track profile (140B).

The claws (163) grip the enclosure (13) by entangling in the receptacles (142) of the inclined groves (141); and ungrip the enclosure (13) only by a pulling force towards the part one (12A) of the wearable arrangement (12) towards the user (120), and in no other direction. Such a force is easily apply-able by the user (120) but not others.

The receiver port (140) of the death triggered device as per present invention has a provision to collate electrical energy from vicinity and may not need the delivery device (160) at all. As a variation, the delivery device (160) may have a contactless or a radio transmittable energy capability, whereby the delivery port (161) may not have the connecting cord (162). The set of receiver tracks (140A) function as a receptor for electrical energy transmitted by a radio waves.

The functions described of the death triggered device (100) are crucial to the person; however, the death triggered device (100) is not intended to be perceived as an emergency aid and usable only in difficult times, lest the user (120) does NOT wear it all the time, which is crucial to achieve the intended services from the present invention. In other words, while the crisis time (84) is when the death triggered device adds its inventive value for the user (120), the user (120) ought to perceive the death triggered device (100) as an all-time companion, most of the time of use of the death triggered device (100) is the peace time (83).

In this back drop, the death triggered device (100) as per present invention is a mini assistant and or for online banking, e-commerce and casual gaming in the peace time (83).

Figure 14:
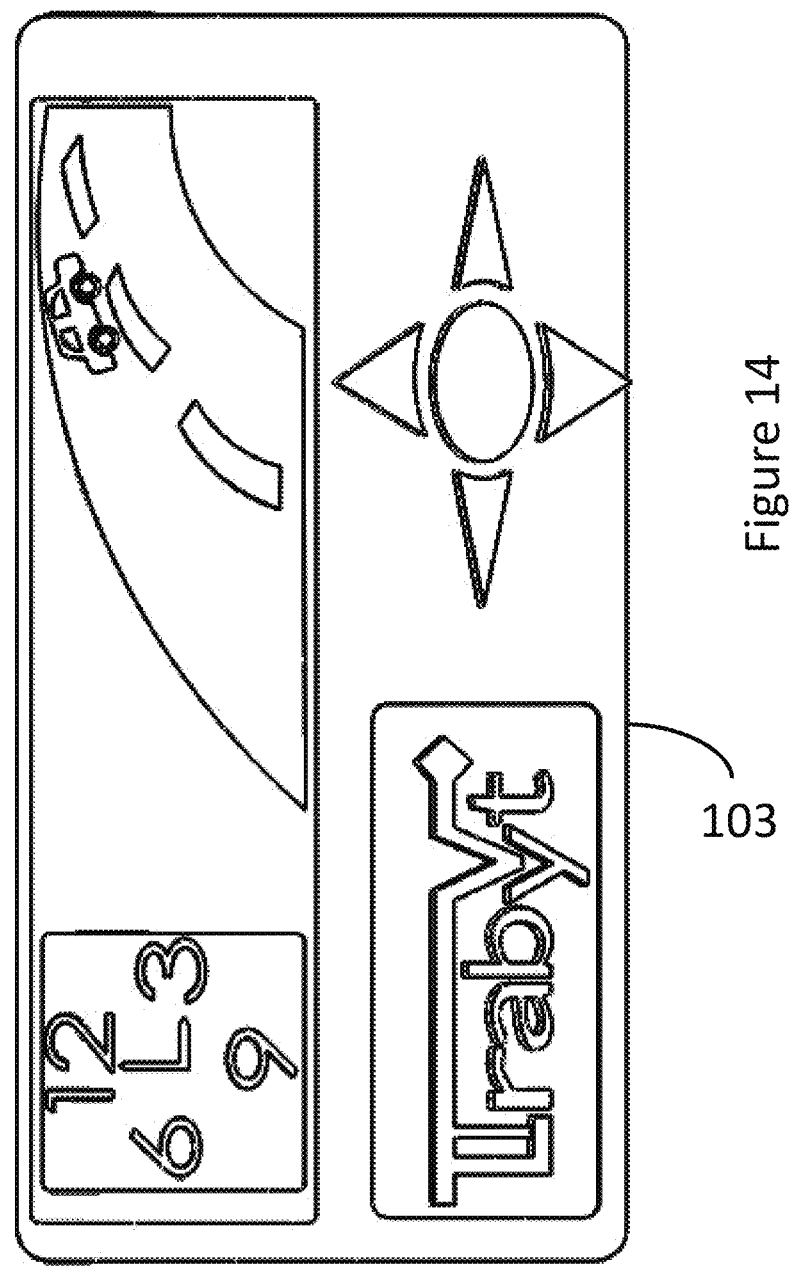
Figure 14A:
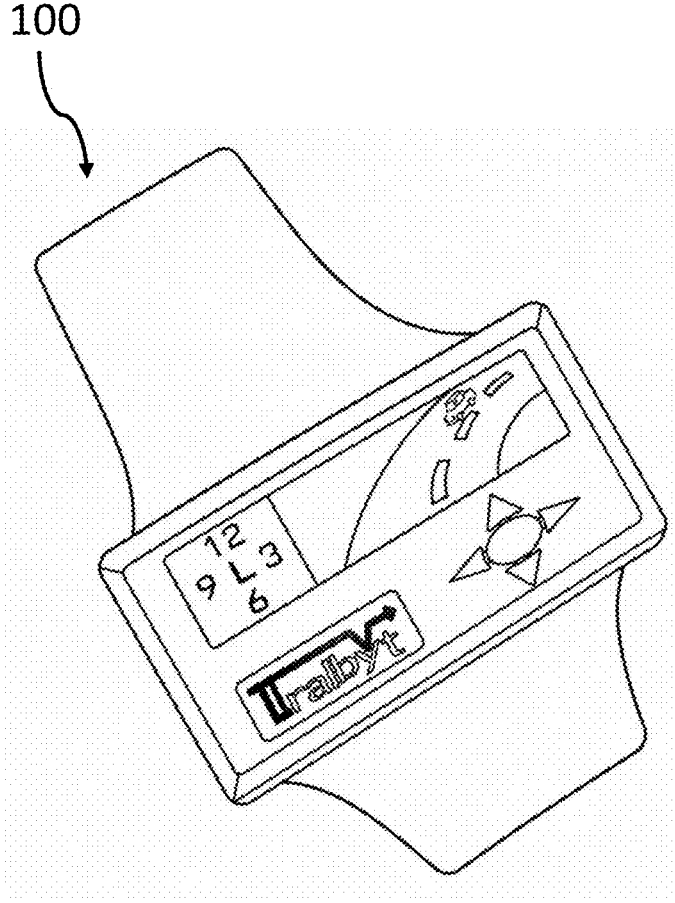
FIG. 14A is a perspective view of the death triggered device with the lazy display, both figures showing a brand "Ltrabyt" of the death triggered device.

FIG. 14, 14A, the death triggered device (100) in general shows a lazy display (103) in a fun mode including a time clock in different configurations like a digital display, a gaming menu (104) and other entertainment display et cetera, with an inventive feature-clock freeze (89) such that the display of the time clock freezes at and after the death triggered device (100) detects a state of death (71). The death triggered device (100) may be configured to also communicate the instant of life to death transition to a plurality of pre-configured persons and or institutions.

In an event that the internet communication and or radio communication is unsuccessful, the death triggered device (100) repeatedly attempts such communication till end of power and executes the intended communication as soon as the death triggered device (100) finds a communication network, with a time stamp of first communication attempt.

The death triggered device (100) as per present invention is intended to be branded as "Ltrabyt", as shown in FIGS. 14 and 14A for which a trademark application is already filed in India.

We claim:

1. A death monitoring system, comprising:
a plurality of user associated sensors which interact with the user, each corresponding to measurable user physical parameters, including at least one user identity sensor in communication with a user providing user identifying data,
at least one user medical condition sensor in communication with said user each providing a user medical condition signal,
an operational sensor providing validation of death monitoring system operability having continued interaction of user associated sensors with said user and continued death monitoring system functioning, wherein the operational sensor confirms that the user is wearing the death triggered system and differentiates between a "no electric energy" situation of the death triggered system as different from a state of death or sabotage;
an embedded electronics circuitry capable of radio and internet communication comprising an 8 bit-microcontroller type, wherein by executing instructions in a single clock cycle, the death triggered system achieves throughput approaching one million instructions per second (MIPS) per megahertz, wherein radio communication and internet communication are invoked only for releasing instructions from the system;
a non-volatile user memory receiving and storing said user identifying data, pre-recorded messages, and documents, and receiving and storing each said medical condition signal as medical condition data; and
a processor operable providing a state of life characterization signal according to a stored program responsive to said user identifying data providing verification of the identity of said user,
and responsive to said user medical condition data by comparison to segregated portions of selected ranges of said medical condition data into a first health status, a death status, and a second health status between said first health status and said death status, wherein
said first health status is determined by medical condition data associated with continuity of life of said user,
said death status is determined by medical condition data associated with termination of life of said user and validation of death monitoring system operability, and
said second health status is determined according to medical condition data intermediate of said first health status medical condition data and said death status medical condition data.

2. A death triggered device comprising:
an 8 bit-microcontroller that executes instructions in an update situation and in a test situation in a single clock cycle to achieve throughput approaching one million instructions per second (MIPS) per megahertz, wherein the microcontroller is configured to provide a run situation having a peace time when the death triggered device is a mini assistant and or for online banking, e-commerce and casual gaming, showing a lazy display (103) in a fun mode including a time clock in a plurality of different configurations selectable from a digital display, a gaming menu (104) and other entertainment display;
embedded electronics circuitry capable of radio communication and internet communication and a set of navigation keys, wherein radio communication and internet communication are invoked only for releasing instructions;
a plurality of mode sensors that confirm that a user is wearing the death triggered device and differentiate between a "no electric energy" situation of the death triggered device as different from a state of death or sabotage, detect a power outage of the electronic circuitry, and detect a sabotage of the death triggered device;
a plurality of primary sensors disposed on an enclosure, the plurality of primary sensors providing corresponding primary sensor signals to the microcontroller,
wherein the plurality of primary sensors continuously and non-invasively monitor a state of life consisting of a state of unstable life and a state of stable life and a state of death determined by relation of the primary sensor signals to benchmark life and health parameters by the microcontroller,
wherein in the peace time, data of the plurality of primary sensors are within a selected range determined in the set-up situation, and
wherein in response to the primary sensor signals from the plurality of primary sensors, the microcontroller switches from the peace time to the crisis time on encountering the state of unstable life or the state of death while the plurality of mode sensors do not indicate a state of non-use of the death triggered device;

a plurality of validation sensors disposed on the enclosure providing corresponding validation sensor signals to the microcontroller, wherein the microcontroller is configured to include personal details and credentials of a specifically identifiable user in an active mode by the user wearing the death triggered device in a set-up situation in response to the primary sensor signals and validation sensor signals stored as benchmark life and health parameters of the user and wherein in the update situation, baseline health and biometric parameters which change over time due to health and/or aging of the user are updatable by the user using the death triggered device;

an interlocked charging port having a removable plurality of interlocked charging arrangements disposable on a left side or a right side on the enclosure, each of the plurality of interlocked charging arrangements comprising an energy receiver port disposed on the death triggered device engage-able and dis-engage-able with an energy delivery port of an energy delivery device external to the death triggered device, the energy receiver port having a polarized construction such that the energy delivery port is mechanically attachable only in a prescribed orientation and in a worn situation the energy receiver port is a modular unit situated on an arm side of the user and not on a palm side and insertible on a side of a housing assembly of the death triggered device so that a connecting cord of the energy delivery port lies on the arm side and does not entangle with palm fingers of the user;

a non-volatile memory storing data files, pre-recorded messages, and documents; and a wrist/arm wrapping strap that retains the enclosure, wherein on restoration of power by charging, the death triggered device first assumes an inactive mode and thereafter the validation sensors followed by the primary sensors restore the functioning of the death triggered device.

3. The death triggered device of claim 2, wherein the plurality of primary sensors are pulse sensors that count a pulse corresponding to a heartbeat count of the user.

4. The death triggered device of claim 2, wherein the plurality of primary sensors comprise an oxygen saturation sensor, a body temperature sensor, a vibration sensor, or a combination thereof.

5. The death triggered device of claim 2, wherein the plurality of validation sensors comprise a biometric sensor including a biometric fingerprint reader, iris, face, voice, sound of a heartbeat, and or a combination thereof, identifying through reading or measuring light, temperature, speed, sound, tissue texture, body fluid and or life energies of the user.

6. The death triggered device of claim 2, wherein the plurality of mode sensors comprise a stretch sensor, wherein when the death triggered device is in an active mode when the stretch sensor is stretched and electric energy is available.

7. The death triggered device of claim 2, wherein the plurality of mode sensors comprise a switching device that closes the embedded electrical circuitry in the active mode.

8. The death triggered device of claim 7, wherein the switching device has a first wire that run through a plurality of strap holes that is snapped by a conducting plug that acts as a shorting link to snap electrical continuity to keep the switching device in an off state.

9. The death triggered device of claim 2, wherein in the update situation, configurable legal documents, contact details, bank details, wishful instructions, and/or wishful transactions are capable of being uploaded to the death triggered device.

10. The death triggered device of claim 9, wherein the death triggered device is configured to send reminders at a regular interval to the user update the legal documents, contact details, bank details, wishful instructions, and/or wishful transactions.

11. The death triggered device of claim 2, wherein when the death triggered device senses the unstable state of life, the user is prompted to make changes to a will and digitally authorize an amended will through a secure digital signature authenticated by the user.

12. The death triggered device of claim 11, wherein the secure digital signature includes a digital signature of the user coupled with two additional secure digital signatures of pre-agreed persons, wherein on invocation of the secure digital signature, the death triggered device sends a notification to the pre-agreed persons to acknowledge and accept the invocation.

13. The death triggered device of claim 2, wherein when the death triggered device senses the unstable state of life, the user is prompted to trigger pre-identified financial transactions by accepting a prompt from the death triggered device.

14. The death triggered device of claim 13, wherein the pre-identified financial transactions are secured by a onetime security password received on a source device including a registered mobile number or a registered email ID, wherein the death triggered device is configurable to pick such one-time security password from the source device.

15. The death triggered device of claim 2, wherein in the test situation, the death triggered device simulates one or more trial actions to verify the death triggered device for functionality in the unstable state of life or the state of death in the run situation.

16. The death triggered device of claim 2, wherein in the crisis time, the death triggered device manages events and instructions pre-configured in the set-up situation and the update situation.

17. The death triggered device of claim 2 having a display that digitally displays a time clock whose display freezes at and after the death triggered device detects the state of death, wherein the death triggered device is configured to communicate the instant of life to death transition to a plurality of pre-configured persons and or institutions.

18. The death triggered device of claim 2, wherein the receiver port of the interlocked charging arrangement is disposable on a left side or a right side of the enclosure.

19. The death triggered device of claim 2, wherein the receiver port is electrically connected in a parallel circuit to invoke an extra fast charging of the death triggered device in the crisis time.

20. The death triggered device of claim 2, wherein the receiver port has a trapezoid shape with complementing trapezoid pair of inclined groves and a pair of receptacles in an inside of either end of the inclined groves and the delivery port has a pair of claws and is slidably engageable only from a user side and disenageable only toward the user side.

21. The death triggered device of claim 20, wherein the pair of claws grip the enclosure by entangling in the pair of receptacles and ungrip by a pulling force toward the user.

22. The death triggered device of claim 2, wherein the delivery port and the energy receiver port engagement and disengagement cause a mechanical wiping action between a set of delivery tracks of the energy delivery port and a set of delivery tracks of the energy receiver port to cleanse the sets of tracks.

23. The death triggered device of claim 22, wherein the set of receiver tracks are a receptor for electrical energy transmitted by radio waves.

24. The death triggered device of claim 2, wherein the receiver port is provisioned to collate electrical energy without mechanically engaging with a delivery port of the delivery device.

25. The death triggered device of claim 2, wherein when internet communication or radio communication is unsuccessful, communication is attempted until end of electric power and executes communication when a communication network is found, providing a time stamp of a first communication attempt.

\* \* \* \* \*